United States Patent
Kim et al.

(10) Patent No.: US 9,844,030 B2
(45) Date of Patent: Dec. 12, 2017

(54) METHOD AND DEVICE FOR TRANSMITTING CONTROL INFORMATION IN WIRELESS COMMUNICATION SYSTEM

(75) Inventors: Hakseong Kim, Anyang-si (KR); Hanbyul Seo, Anyang-si (KR); Suckchel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/000,838

(22) PCT Filed: Mar. 14, 2012

(86) PCT No.: PCT/KR2012/001842
§ 371 (c)(1),
(2), (4) Date: Aug. 21, 2013

(87) PCT Pub. No.: WO2012/124981
PCT Pub. Date: Sep. 20, 2012

(65) Prior Publication Data
US 2013/0329686 A1 Dec. 12, 2013

Related U.S. Application Data

(60) Provisional application No. 61/452,617, filed on Mar. 14, 2011, provisional application No. 61/453,131, (Continued)

(51) Int. Cl.
*H04W 72/04* (2009.01)
*H04L 5/00* (2006.01)
(Continued)

(52) U.S. Cl.
CPC ............ *H04W 72/04* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

2009/0209247 A1* 8/2009 Lee ................. H04L 5/0007
455/422.1
2009/0238091 A1 9/2009 Kim et al.
(Continued)

FOREIGN PATENT DOCUMENTS

| | | | |
|---|---|---|---|
| JP | 2009-232463 A | 10/2009 | |
| JP | 2011-529662 A | 12/2011 | |

(Continued)

OTHER PUBLICATIONS

CMCC, "Un R-PDCCH Design," 3GPP TSG-RAN WG1 #61bis, R1-104118, Dresden, Germany, Jun. 28-Jul. 2, 2010, pp. 1-7, XP050449522.

(Continued)

*Primary Examiner* — Jeffrey M Rutkowski
*Assistant Examiner* — Andre Tacdiran
(74) *Attorney, Agent, or Firm* — Birch, Stewart, Kolasch & Birch, LLP

(57) ABSTRACT

The present invention relates to a wireless communication system. More specifically, the present invention relates to a method and a device therefor, wherein a method for receiving a downlink control channel in a communication device having a plurality of cells in a wireless communication system comprises the steps of: receiving a subframe containing a plurality of search space resources which are preset to transmit a plurality of downlink control channel candidates, wherein each search space resource corresponds to each cell; and monitoring said plurality of the control channel candidates from at least a portion of said plurality of the search space resources, for said downlink control channel, wherein among said plurality of the cells, if there are (Continued)

one or more specific cells in which downlink transmission is limited at said subframe, search space resources corresponding to said one or more specific cells are used to transmit downlink control channel candidates or downlink shared channels of other cells.

4 Claims, 26 Drawing Sheets

Related U.S. Application Data filed on Mar. 16, 2011, provisional application No. 61/469,076, filed on Mar. 29, 2011.

(51) Int. Cl.
  H04L 5/14 (2006.01)
  H04L 1/00 (2006.01)
  H04L 1/06 (2006.01)
(52) U.S. Cl.
  CPC .......... *H04L 1/0026* (2013.01); *H04L 1/0038* (2013.01); *H04L 1/0061* (2013.01); *H04L 1/0071* (2013.01); *H04L 1/06* (2013.01); *H04L 5/1469* (2013.01); *H04L 2001/0097* (2013.01)

(56) References Cited

U.S. PATENT DOCUMENTS

| 2010/0227569 | A1* | 9/2010 | Bala ...................... H04L 5/0007 455/73 |
| 2010/0261468 | A1 | 10/2010 | Chun et al. |
| 2011/0026449 | A1 | 2/2011 | Kuo |
| 2011/0110316 | A1* | 5/2011 | Chen ...................... H04L 5/0053 370/329 |
| 2011/0194514 | A1 | 8/2011 | Lee et al. |
| 2011/0269492 | A1* | 11/2011 | Wang ........................... 455/509 |
| 2012/0051270 | A1* | 3/2012 | Chen et al. ................... 370/279 |
| 2012/0051306 | A1 | 3/2012 | Chung et al. |
| 2012/0063349 | A1 | 3/2012 | Kim et al. |
| 2012/0099518 | A1 | 4/2012 | Park et al. |
| 2012/0188961 | A1* | 7/2012 | Suzuki .............. H04W 74/0833 370/329 |
| 2013/0016655 | A1* | 1/2013 | Heo et al. ..................... 370/328 |
| 2013/0028108 | A1* | 1/2013 | Wu .......................... H04L 5/001 370/252 |
| 2013/0051214 | A1* | 2/2013 | Fong et al. ................... 370/216 |
| 2013/0315092 | A1* | 11/2013 | Yu ..................... H04W 52/0216 370/252 |
| 2013/0336263 | A1* | 12/2013 | Wang ..................... H04L 5/003 370/329 |

FOREIGN PATENT DOCUMENTS

| JP | 2012-525803 A | 10/2012 |
| KR | 10-2010-0118067 A | 11/2010 |
| KR | 10-2010-0123650 A | 11/2010 |
| WO | WO 2010/013961 A2 | 2/2010 |
| WO | WO 2010/127300 A2 | 11/2010 |
| WO | WO 2010/151093 A2 | 12/2010 |

OTHER PUBLICATIONS

Huawei et al., "Search spaces on one CC for the cross-CC scheduling," 3GPP TSG RAN WG1 meeting #61, R1-103083, Montreal, Canada, May 10-14, 2010, 8 pages, XP050420164.

Intel Corporation (UK) Ltd., "Offset Design of PDCCH Search Space," 3GPP TSG RAN WG1 Meeting #62, R1-104377, Madrid, Spain, Aug. 23-27, 2010, pp. 1-4, XP050449728.

LG Electronics, "Considerations on PDCCH Blind Decoding Carrier Aggregation," 3GPP TSG RAN WG1 Meeting #61bis, R1-103956, Dresden, Germany, Jun. 28-Jul. 2, 2010, 3 pages, XP050449437.

CMCC, "Un R-PDCCH Search Space," 3GPP TSG-RAN WG1 #62, R1-104730, Madrid, Spain, Aug. 23-27, 2010, pp. 1-5 (6 pages).

LG Electronics, "Resource Allocation and Downlink Control Channel Structure for Relay Backhaul Link," 3GPP TSG RAN WG1 Meeting #57, R1-092115, San Francisco, USA, May 4-8, 2009, 8 pages.

Samsung, "Confusion between DCI Formats for Different CCs, Tx Modes and Bandwidths," 3GPP TSG RAN WG1 #61BIS, R1-103632, Dresden, Germany, Jun. 28-Jul. 2, 2010, pp. 1-3.

Catt, "On Rel-10 Relay Features and Higher Layer Signaling," 3GPP TSG RAN WG1 Meeting #62bis, R1-105179, Xi'an, China, Oct. 11-15, 2010.

* cited by examiner

| FDD/TDD | Subframe number | | | | | | | | | |
|---|---|---|---|---|---|---|---|---|---|---|
| | 0 | 1 | 2 | 3 | 4 | 5 | 6 | 7 | 8 | 9 |
| PCC | X | X | X | B | X | X | X | B | X | X |
| SCC | X | X | X | B | X | X | B | X | X | X |

Case 1: Different backhaul configuration

| FDD/TDD | Subframe number | | | | | | | | | |
|---|---|---|---|---|---|---|---|---|---|---|
| | 0 | 1 | 2 | 3 | 4 | 5 | 6 | 7 | 8 | 9 |
| PCC | A | A | A | A | A | A | A | A | A | A |
| SCC | A | A | A | A | DA | DA | DA | DA | A | A |

Case 2: SCC deactivation

| TDD | Subframe number | | | | | | | | | |
|---|---|---|---|---|---|---|---|---|---|---|
| | 0 | 1 | 2 | 3 | 4 | 5 | 6 | 7 | 8 | 9 |
| PCC | D | S | U | D | D | D | S | U | D | D |
| SCC | D | S | U | U | U | D | D | D | D | D |

Case 3: Different TDD configuration

Cross-carrier scheduling is not allowed in the same subframe

FIG. 23
Case 1: All search spaces are shared
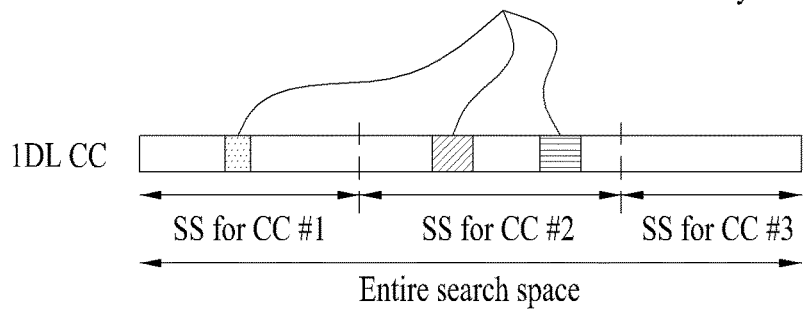
Case 2: Search spaces are partially shared
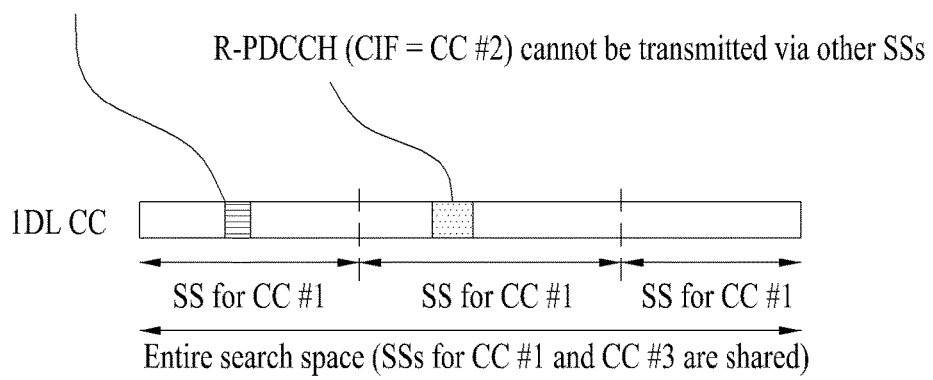

METHOD AND DEVICE FOR TRANSMITTING CONTROL INFORMATION IN WIRELESS COMMUNICATION SYSTEM

CROSS REFERENCE TO RELATED APPLICATIONS

This application is the National Phase of PCT/KR2012/001842 filed on Mar. 14, 2012, which claims priority under 35 U.S.C. 119(e) to U.S. Provisional Application No. 61/452,617 filed on Mar. 14, 2011, U.S. Provisional Application No. 61/453,131 filed on Mar. 16, 2011 and U.S. Provisional Application No. 61/469,076 filed on Mar. 29, 2011, all of which are hereby expressly incorporated by reference into the present application.

TECHNICAL FIELD

The present invention relates to a wireless communication system, and more particularly, to a method and apparatus for transmitting control information in a wireless communication system supporting carrier aggregation (CA).

BACKGROUND ART

Wireless communication systems have been diversified in order to provide various types of communication services such as voice or data service. In general, a radio communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) system and the like.

DISCLOSURE

Technical Problem

An object of the present invention is to provide a method and apparatus for efficiently transmitting control information in a wireless communication system. Another object of the present invention is to provide a channel format and a resource allocation and signal processing method or efficiently transmitting control information, and an apparatus therefor. Another object of the present invention is to provide a method of efficiently allocating resources for transmitting control information and an apparatus therefor.

The technical problems solved by the present invention are not limited to the above technical problems and those skilled in the art may understand other technical problems from the following description.

Technical Solution

The object of the present invention can be achieved by providing a method of receiving a downlink control channel at a communication apparatus configured with a plurality of cells in a wireless communication system including receiving a subframe including a plurality of predetermined search space resources for transmitting a plurality of downlink control channel candidates, wherein each search space resource corresponds to each cell, and monitoring the plurality of control channel candidates in at least some of the plurality of search space resources for the downlink control channel. If one or more specific cells on which downlink transmission is restricted in the subframe are present in the plurality of cells, one or more search space resources corresponding to the one or more specific cells are used to transmit downlink control channel candidates of other cells or a downlink shared channel.

If the search space resources corresponding to the one or more specific cells are used to transmit the downlink control channel candidates of the other cells, the downlink control channel candidates of the other cells may be configured to have the same information size and the downlink control channel candidates having the same information size may be distinguished using a carrier indicator field (CIF) value.

If the search space resources corresponding to the one or more specific cells are used to transmit the downlink control channel candidates of the other cells, the search spaces resources corresponding to the one or more specific cells may be merged into a search space resource of a reference cell among the plurality of cells.

The resources in which the downlink control channel candidates are started may be non-contiguously configured within the merged search space resource.

The subframe may include a plurality of orthogonal frequency division multiple access (OFDMA) symbols, the plurality of predetermined search space resources may be set within OFDMA symbols other than the first M OFDMA symbols in the subframe, and M may be a positive integer.

The method may further include receiving resource block allocation information through a radio resource control (RRC) message, and the resource block allocation information may be used to indicate the plurality of predetermined search space resources.

In another aspect of the present invention, provided herein is a communication apparatus configured to receive a downlink control channel in a state in which a plurality of cells is configured in a wireless communication system including a radio frequency (RF) unit, and a processor. The processor is configured to receive a subframe including a plurality of predetermined search space resources for transmitting a plurality of downlink control channel candidates, wherein each search space resource corresponds to each cell, and to monitor the plurality of control channel candidates in at least some of the plurality of search space resources for the downlink control channel, and, if one or more specific cells on which downlink transmission is restricted in the subframe are present in the plurality of cells, one or more search space resources corresponding to the one or more specific cells are used to transmit downlink control channel candidates of other cells or a downlink shared channel.

Advantageous Effects

According to the present invention, it is possible to efficiently transmit control information in a wireless communication system. It is possible to provide a channel format and a resource allocation and a signal processing method for efficiently transmitting control information. It is possible to efficiently allocate resources for transmitting control information.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings:

FIGS. 22 to 28 are diagrams showing examples of configuring a search space using a search space sharing method;

BEST MODE

The following embodiments of the present invention may be utilized in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, or a Multi Carrier Frequency Division Multiple Access (MC-FDMA) system. The CDMA system may be implemented as radio technology such as Universal Terrestrial Radio Access (UTRA) or CDMA2000. The TDMA system may be implemented as radio technology such as Global System for Mobile communications (GSM)/General Packet Radio Service (GPRS)/Enhanced Data Rates for GSM Evolution (EDGE). The OFDMA system may be implemented as radio technology such as IEEE 802.11 (Wi-Fi), IEEE 802.16 (WiMAX), IEEE 802-20 or E-UTRA (Evolved UTRA). The UTRA system is part of the Universal Mobile Telecommunications System (UMTS). A 3$^{rd}$ Generation Partnership Project Long Term Evolution (3GPP LTE) communication system is part of the E-UMTS (Evolved UMTS) which employs the E-UTRA. The LTE-Advanced (LTE-A) is an evolved version of the 3GPP LTE. Although the following embodiments focus on the 3GPP LTE/LTE-A system for clarity of description, the technical features of the present invention are not limited thereto.

In a wireless communication system, a user equipment (UE) receives information from a base station (eNB) in downlink (DL) and transmits information to an eNB in uplink (UL). Information transmitted/received between an eNB and a UE includes data and a variety of control information and various physical channels may be used according to kind/use of transmitted/received information.

Figure 1:
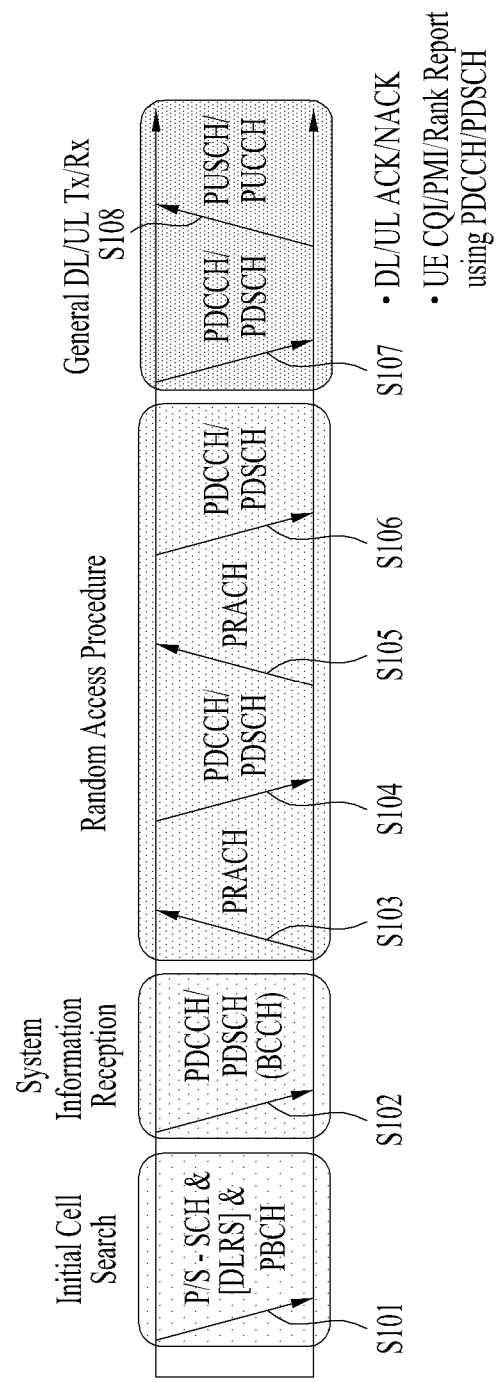
FIG. 1 is a diagram showing physical channels used in a 3$^{rd}$ Generation Partnership Project (3GPP) system and a general signal transmission method using the same.

FIG. 1 is a diagram showing physical channels used in a 3GPP system and a general signal transmission method using the same.

A UE performs an initial cell search operation such as synchronization with an eNB when power is turned on or the UE enters a new cell in step S101. The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to check a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information in step S102.

Thereafter, the UE may perform a Random Access Procedure (RACH) of steps S103 to S106 in order to complete access to the eNB. In this case, the UE may transmit a preamble through a Physical Random Access Channel (PRACH) (S103), and receive a response message of the preamble through the PDCCH and the PDSCH corresponding thereto (S104). In the case of contention-based RACH, a contention resolution procedure such as transmission (S105) of an additional PRACH and reception (S106) of the PDCCH and the PDSCH corresponding thereto may be further performed.

The UE which performs the above procedures may perform PDCCH/PDSCH reception (S107) and Physical Uplink Shared Channel PUSCH)/Physical Uplink Control Channel (PUCCH) transmission (S108) as a general uplink/downlink signal transmission procedure. The control information transmitted from the UE to the eNB is collectively referred to as uplink control information (UCI). The UCI includes hybrid automatic repeat and request acknowledgement/negative-ACK (HARQ ACK/NACK), scheduling request, channel state information (CSI), etc. The CSI includes a channel quality indicator (CQI), a precoding matrix index (PMI), a rank indicator (RI), etc. The UCI is generally transmitted via a PUCCH, but may be transmitted via a PUSCH if control information and traffic data are simultaneously transmitted. The UCI may be aperiodically transmitted via a PUSCH according to a network request/instruction.

Figure 2:
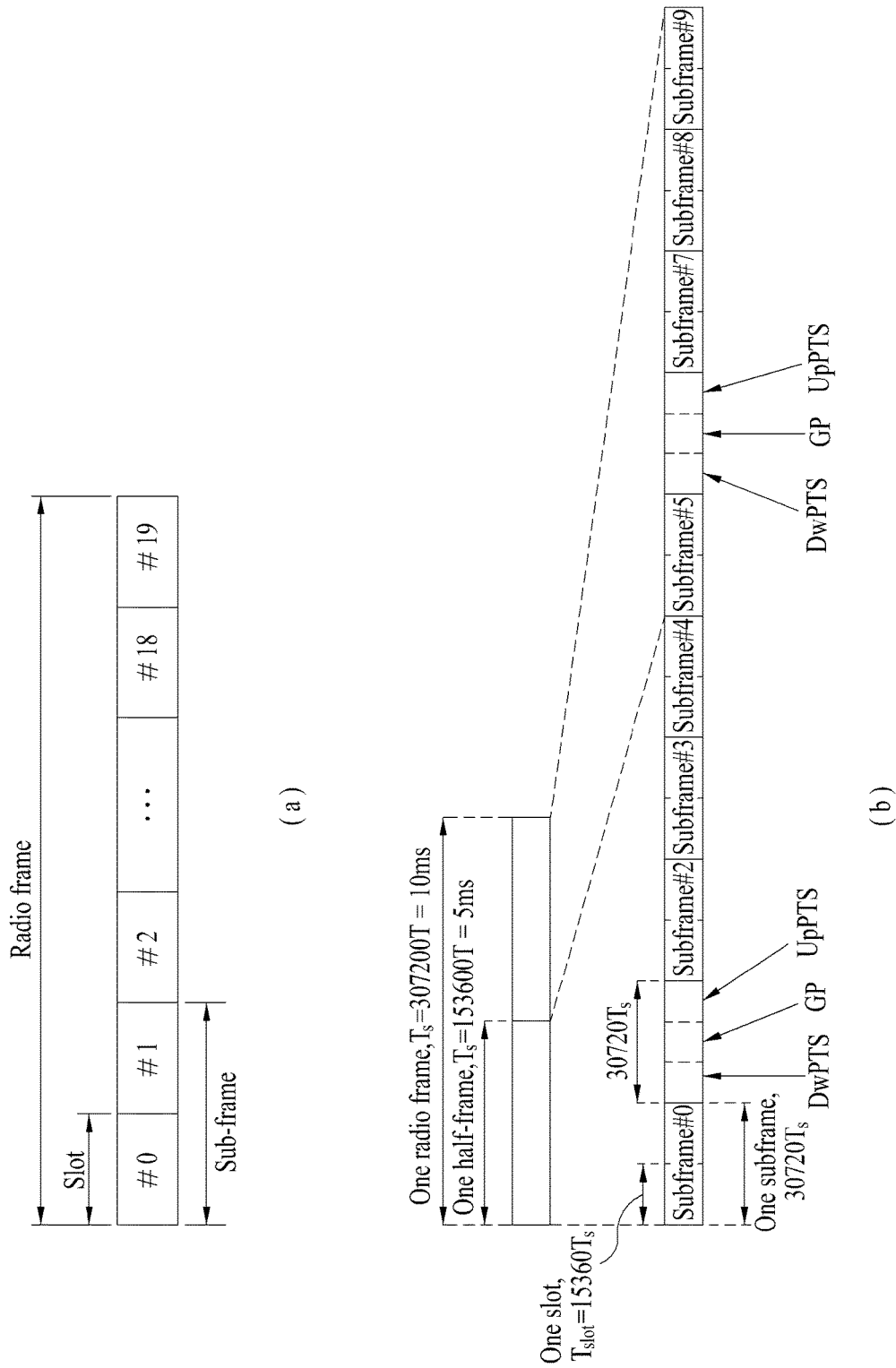
FIG. 2 is a diagram showing the structure of a radio frame.

FIG. 2 shows the structure of a radio frame. In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 2(a) is a diagram showing the structure of the type 1 radio frame. A downlink radio frame includes 10 subframes, and one subframe includes two slots in a time domain. A time required to transmit one subframe is defined as a Transmission Time Interval (TTI). For example, one subframe may have a length of 1 ms and one slot may have a length of 0.5 ms. One slot may include a plurality of OFDM symbols in a time domain and include a plurality of Resource Blocks (RBs) in a frequency domain. Since the 3GPP LTE system uses OFDM in downlink, the OFDM symbol indicates one symbol interval. The OFDM symbol may be called a SC-FDMA symbol or a symbol interval. An RB is a resource allocation unit and includes a plurality of contiguous carriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, since the length of one OFDM symbol is increased, the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first at most three OFDM symbols of each subframe may be allocated to a Physical Downlink Control Channel (PDCCH) and the remaining OFDM symbols may be allocated to a Physical Downlink Shared Channel (PDSCH).

FIG. 2(b) is a diagram showing the structure of the type 2 radio frame. The type 2 radio frame includes two half frames, each of which includes five subframes, a downlink pilot time slot (DwPTS), a guard period (GP), and an uplink pilot time slot (UpPTS). One subframe includes two slots. The DwPTS is used for initial cell search, synchronization and channel estimation at a UE. The UpPTS is used for channel estimation and uplink transmission synchronization at an eNB. The guard period is to remove interference occurring in uplink due to multi-path delay of a downlink signal between uplink and downlink.

The structure of the radio frame is only exemplary. Accordingly, the number of subframes included in the radio frame, the number of slots included in the subframe or the number of symbols included in the slot may be changed in various manners.

Figure 3:
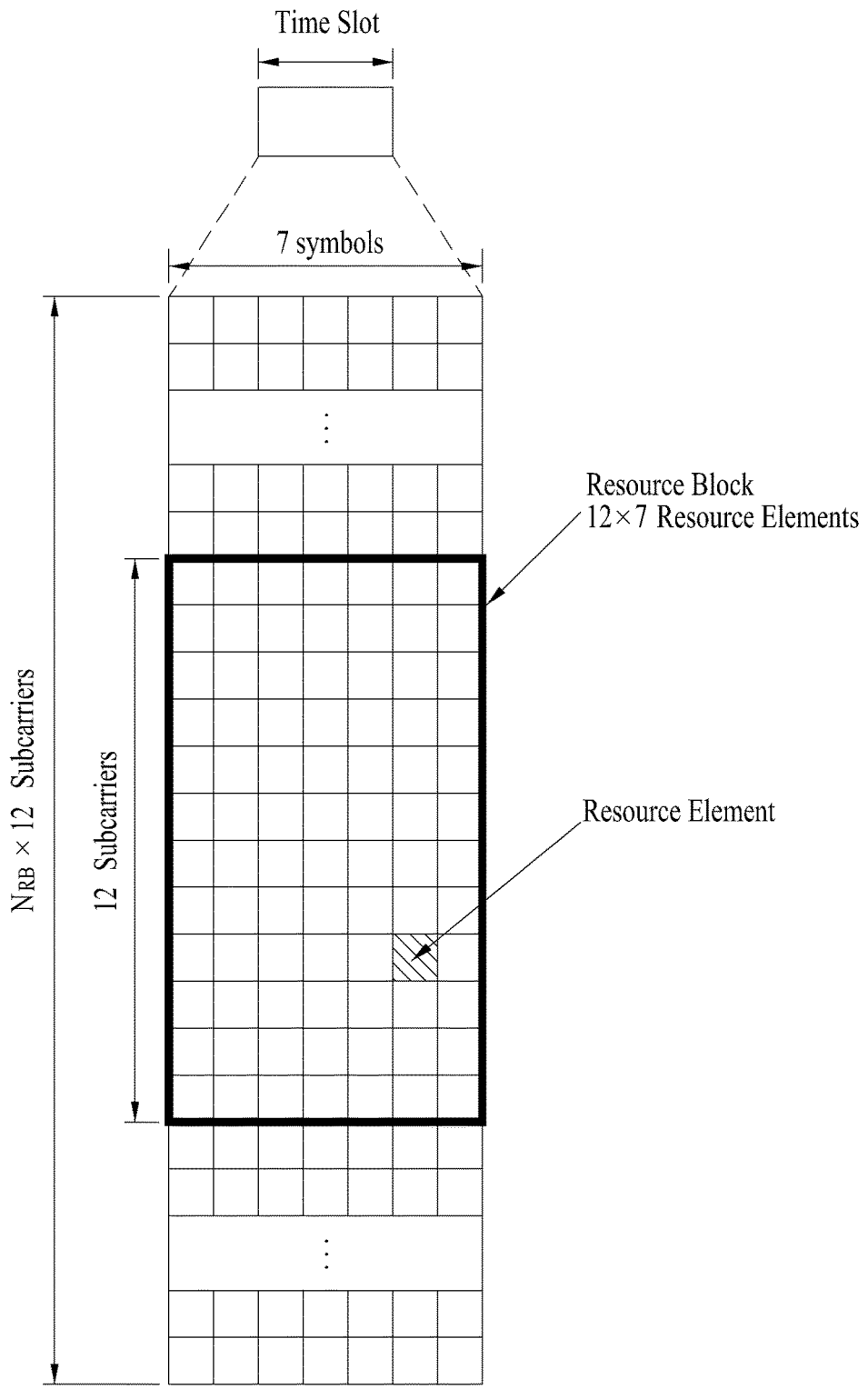
FIG. 3 is a diagram showing a resource grid of a downlink slot.

FIG. 3 is a diagram showing a resource grid in a downlink slot.

Referring to FIG. 3, the downlink slot includes a plurality of OFDM symbols in a time domain. Although one downlink slot includes seven OFDM symbols and one RB includes 12 subcarriers in a frequency domain in FIG. 3, the present invention is not limited thereto. Each element of the resource grid is referred to as a Resource Element (RE). One RB includes 12×7 REs. The number $N^{DL}$ of RBs included in the downlink slot depends on a downlink transmission bandwidth. The structure of the uplink slot may be equal to the structure of the downlink slot.

Figure 4:
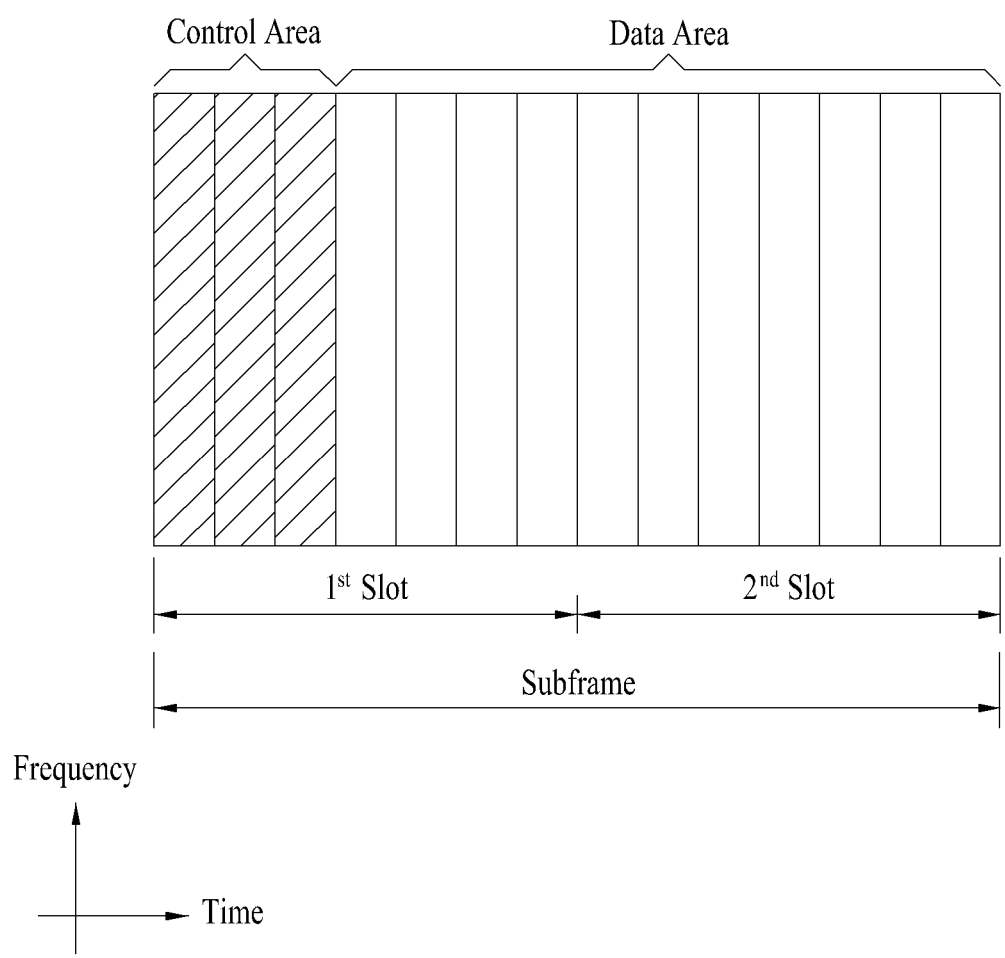
FIG. 4 is a diagram showing the structure of a downlink frame.

FIG. 4 is a diagram showing the structure of a downlink subframe.

Referring to FIG. 4, a maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted via a first OFDM symbol of a subframe, and carries information about the number of OFDM symbols used to transmit the control channel in the subframe. The PHICH carries a HARQ ACK/NACK signal as a response to uplink transmission. The control information transmitted through the PDCCH is referred to as Downlink Control Information (DCI). The DCI includes uplink or downlink scheduling information or an uplink transmit (Tx) power control command for an arbitrary UE group.

The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation information of an higher layer control message such as a Random Access Response (RAR) transmitted via the PDSCH, a Tx power control command for an individual UEs in an arbitrary UE group, a Tx power control command, activation of Voice over IP (VoIP), etc. A plurality of PDCCHs may be transmitted within the control region. The UE may monitor the plurality of PDCCHs. The PDCCHs are transmitted on an aggregation of one or a plurality of consecutive control channel elements (CCEs). The CCE is a logical allocation unit used to provide the PDCCHs at a predetermined coding rate based on the state of a radio channel. The CCE corresponds to a plurality of resource element groups (REGs). The format of the PDCCH and the number of available PDCCH bits are determined based on a correlation between the number of CCEs and the coding rate provided by the CCEs. The eNB determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

The PDCCH carries a message known as DCI and the DCI includes resource allocation and other control information for one UE or UE group. In general, a plurality of PDCCHs may be transmitted within one subframe. Each PDCCH is transmitted using one or more control channel elements (CCEs) and each CCE corresponds to 9 sets of four REs. Four REs are known as a resource element group (REG). Four QPSK symbols are mapped to each REG. An RE allocated by a reference signal (reference symbol) is not included in the REG and thus the total number of REGs within a given OFDM symbol is changed depending on presence/absence of a cell-specific reference signal. The REG concept (that is, group unit mapping, each group including four REs) may be used even on other downlink control channels (PCFICH and PHICH). Four PDCCH formats are supported as shown in Table 1.

TABLE 1

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs may be consecutively numbered and a PDCCH having a format composed of n CCEs may start only at CCEs equal in number to a multiple of n in order to simplify a decoding process. The number of CCEs used for transmission of a specific PDCCH is determined by an eNB according to channel conditions. For example, if a PDCCH is for a UE having a good downlink channel (e.g., a UE close to an eNB), only one CCE may be used. However, if a PDCCH is for a UE having a bad channel (e.g., a UE close to a cell boundary), eight CCEs may be used in order to obtain sufficient robustness. In addition, a power level of a PDCCH may be controlled according to channel conditions.

A method introduced into LTE defines a CCE position of a restricted set in which a PDCCH may be located for each UE. The CCE position of the restricted set in which the UE can find a PDCCH thereof may be referred to as a "search space". In LTE, the size of the search space is changed according to PDCCH format. In addition, a dedicated (UE-specific) search space and a common search space are separately defined. The dedicated search space is individually set for each UE and the range of the common search space is known to all UEs. The dedicated and common search spaces may overlap with respect to a given UE. If a significantly small search space is used and some CCE positions are allocated to a search space for a specific UE, CCEs are barely left and thus an eNB may not find CCE resources which will be used to transmit a PDCCH to all possible UEs within a given subframe. In order to minimize a possibility that such blocking continues in a next subframe, a UE-specific hopping sequence is applied to a start position of a search space for transmission. The sizes of the common and dedicated search space are shown in Table 2.

TABLE 2

| PDCCH format | Number of CCEs (n) | Number of candidates within common search space | Number of candidates within dedicated search space |
|---|---|---|---|
| 0 | 1 | — | 6 |
| 1 | 2 | — | 6 |
| 2 | 4 | 4 | 2 |
| 3 | 8 | 2 | 2 |

In order to control computation load due to a total number of times of blind decoding (BD), a UE is not required to simultaneously search for all DCI formats. In general, a UE always searches for formats 0 and 1A within a dedicated search space. Formats 0 and 1A have the same size and are distinguished by a flag in a message. In addition, a UE may be required to receive an additional format (e.g., format 1, 1B or 2 according to a PDSCH transmission mode set by an eNB). A UE searches for formats 1A and 1C in a common search space. In addition, a UE may be set to search for a format 3 or 3A. Formats 3 and 3A have the same size as formats 0 and 1A and are distinguished by scrambling a CRC using different (common) identifiers, rather than using a UE-specific identifier. Transmission modes for configuring a multi-antenna technique and information contents of DCI formats are described as follows.

Transmission Mode

Transmission Mode 1: Transmission from an antenna port of a single eNB
Transmission Mode 2: Transmit diversity
Transmission Mode 3: Open-loop space multiplexing
Transmission Mode 4: Closed-loop space multiplexing
Transmission Mode 5: multi-user MIMO
Transmission Mode 6: Closed-loop rank-1 precoding
Transmission Mode 7: Transmission using a UE-specific reference signal DCI Format Format 0: Resource grant for PUSCH transmission (uplink)
Format 1: Resource allocation for single codeword PDSCH transmission (Transmission Modes 1, 2 and 7)
Format 1A: Compact signaling of resource allocation for single codeword PDSCH (all modes)
Format 1B: Compact resource allocation for PDSCH (Mode 6) using rank-1 closed-loop precoding
Format 1C: Very compact resource allocation for a PDSCH (e.g., paging/broadcast system information)
Format 1D: Compact resource allocation for a PDSCH (Mode 5) using multi-user MIMO
Format 2: Resource allocation for a PDSCH (Mode 4) of a closed-loop MIMO operation
Format 2A: Resource allocation for a PDSCH (Mode 3) of an open-loop MIMO operation
Format 3/3a: Power control command having a 2-bit/1-bit power control value for a PUCCH and a PUSCH Considering the above description, a UE is required to perform BD a maximum of 44 times within one subframe. Since checking the same message with different CRC values involves little additional computation complexity, the number of times of checking the same message with different CRC values is not included in the number of times of BD.

Figure 5:
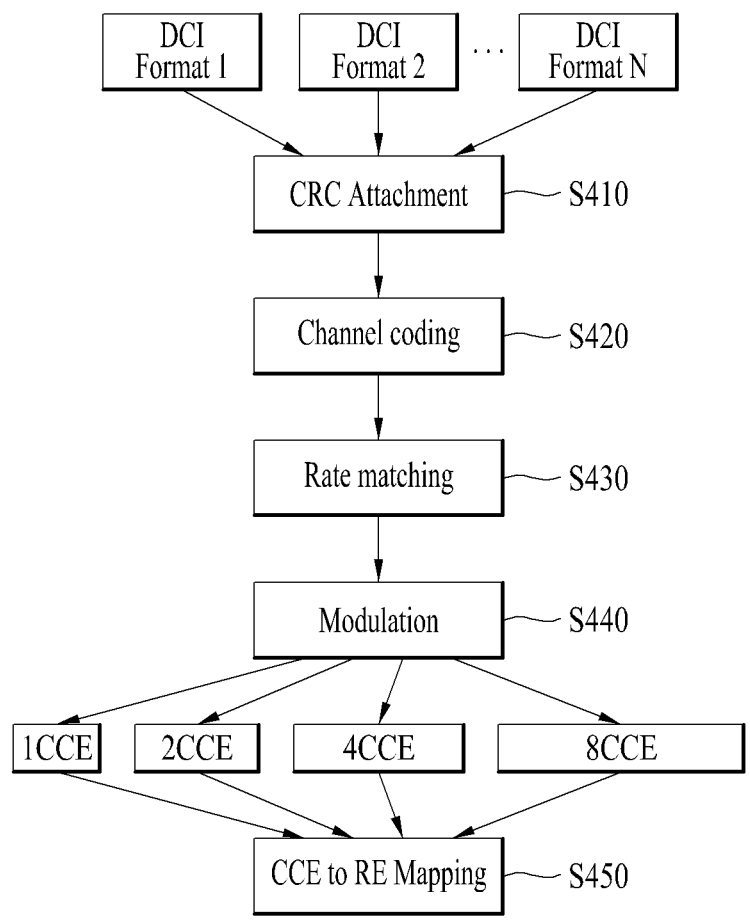
FIG. 5 is a flowchart illustrating a method of configuring a PDCCH at a base station (eNB)

FIG. 5 is a flowchart illustrating a method of configuring a PDCCH at an eNB.

Referring to FIG. 5, the eNB generates control information according to DCI format. The eNB may select one of a plurality of DCI formats 1, 2, . . . , and N according to control information to be transmitted to a UE. In step S410, a cyclic redundancy check (CRC) for error detection is attached to the control information generated according to the DCI format. The CRC is masked with a Radio Network Temporary Identifier (RNTI) according to an owner or usage of the PDCCH. In other words, the PDCCH is CRC-scrambled with an identifier (e.g., RNTI).

Table 3 shows examples of identifiers masked to the PDCCH.

TABLE 3

| Type | Identifier | Description |
| --- | --- | --- |
| UE-specific | C-RNTI, temporary C-RNTI, semi-persistent C-RNTI | Used to uniquely identify a UE |
| Common | P-RNTI | Used for a paging message |
| | SI-RNTI | Used for system information |
| | RA-RNTI | Used for a random access response |

If a C-RNTI, a temporary C-RNTI or a semi-persistent C-RNTI is used, the PDCCH carries UE-specific control information and, if another RNTI is used, the PDCCH carries common control information received by all UEs within a cell. In step S420, the control information to which the CRC is attached is subjected to channel coding so as to generate coded data. In step S430, rate matching according to a CCE aggregation level allocated to a PDCCH format is performed. In step S440, the coded data is modulated so as to generate modulated symbols. The modulated symbols configuring one PDCCH may have one of CCE aggregation levels of 1, 2, 4 and 8. In step S450, the modulated symbols (CCEs) are mapped to REs.

Figure 6:
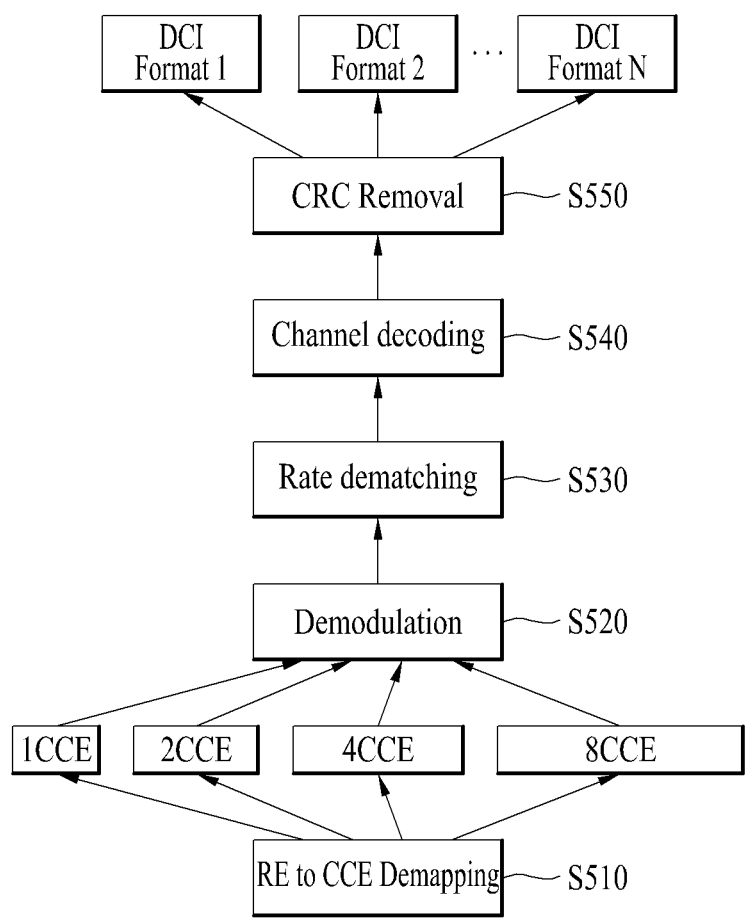
FIG. 6 is a flowchart illustrating a method of processing a PDCCH at a user equipment (UE)

FIG. 6 is a flowchart illustrating a method of processing a PDCCH at a UE.

Referring to FIG. 6, in step S510, the UE demaps physical REs to CCEs. In step S520, since the UE is not aware of a CCE aggregation level, at which the UE receives a PDCCH, demodulation is performed with respect to the CCE aggregation levels. In step S530, the UE performs rate dematching with respect to the demodulated data. Since the UE is not aware of a DCI format (or a DCI payload size) of control information to be received, rate dematching is performed with respect to each DCI format (or each DCI payload size). In step S540, the data subjected to rate dematching is subjected to channel decoding according to a code rate and a CRC is checked to detect whether errors occur. If errors do not occur, it is determined that the UE detects a PDCCH thereof. If errors occur, the UE continues to perform BD with respect to other CCE aggregation levels or other DCI formats (or DCI payload sizes). In step S550, the UE which detects the PDCCH removes the CRC from the decoded data and acquires control information.

A plurality of PDCCHs for a plurality of UEs may be transmitted within a control region of the same subframe. An eNB does not provide a UE with information about the position of a PDCCH in the control region. Accordingly, the UE monitors a set of PDCCH candidates and finds a PDCCH thereof. Monitoring refers to attempts to decode the received PDCCH candidates at the UE according to DCI formats. This is referred to as blind decoding (blind detection). Through blind decoding, the UE identifies the PDCCH transmitted thereto and, at the same time, decodes the control information transmitted through the PDCCH. For example, in the case in which the PDCCH is masked with a C-RNTI, the UE may detect the PDCCH when CRC errors do not occur.

In order to reduce overhead of blind decoding, the number of DCI formats is defined to be less than the number of kinds of control information transmitted using the PDCCH. The DCI information includes a plurality of different information fields. The kind of each information field, the number of information fields, the bit number of each information field, etc. are changed according to DCI format. In addition, the size of the control information matching the DCI format is changed according to DCI format. An arbitrary DCI format may be used to transmit two or more kinds of control information.

Table 4 shows an example of control information transmitted in DCI format 0. In the following description, the bit size of each information field is only exemplary and is not limited thereto.

TABLE 4

| Information field | Bit(s) |
| --- | --- |
| (1) Flag for distinguishing between format 0 and format 1A | 1 |
| (2) Hopping flag | 1 |
| (3) Resource block allocation and hopping resource allocation | $[\log_2(N_{RB}^{UL}(N_{RB}^{UL} + 1)/2)]$ |
| (4) Modulation and coding scheme and redundancy version | 5 |
| (5) New data indicator | 1 |
| (6) TPC command for a scheduled PUSCH | 2 |
| (7) Cyclic shift for DM RS | 3 |
| (8) UL index (TDD) | 2 |
| (9) CQI request | 1 |

The flag field is an information field for distinguishing between format 0 and format 1A. That is, DCI format 0 and 1A have the same payload size and are distinguished by the flag field. The bit size of the resource block allocation and hopping resource allocation field may be changed according to a hopping PUSCH or a non-hopping PUSCH. The resource block allocation and hopping resource allocation field for the non-hopping PUSCH provides $|\log_2(N_{RB}^{UL}(N_{RB}^{UL}+1)/2)|$ bits to resource allocation of a first slot within an uplink subframe. Here, $N_{RB}^{UL}$ is the number of resource blocks included in an uplink slot and depends on an uplink transmission bandwidth set in a cell. Accordingly, the payload size of DCI format 0 may be changed according to uplink bandwidth. DCI format 1A includes an information field for PDSCH allocation and the payload size of DCI format 1A may also be changed according to downlink bandwidth. DCI format 1A provides a reference information bit size for DCI format 0. Accordingly, if the number of information bits of DCI format 0 is less than the number of information bits of DCI format 1A, "0" is added to DCI format 0 until the payload size of DCI format 0 becomes equal to the payload size of DCI format 1A. The added "0" is filled in a padding field of the DCI format.

Figure 7:
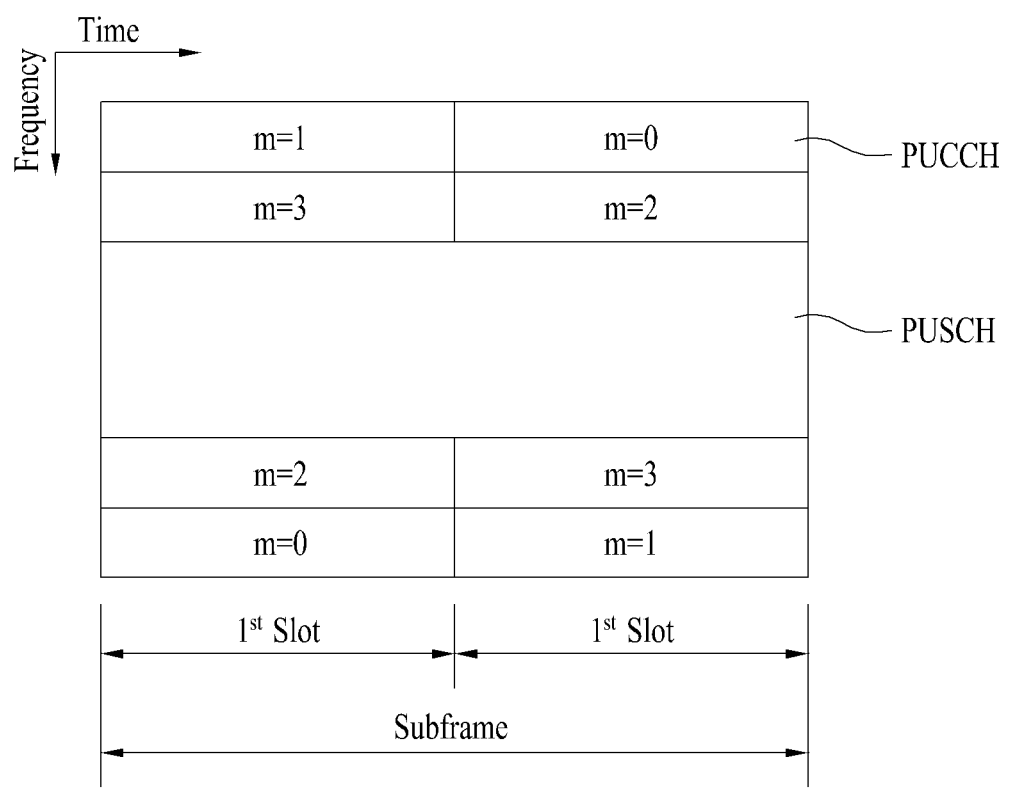
FIG. 7 is a diagram showing the structure of an uplink subframe.

FIG. 7 is a diagram showing the structure of an uplink subframe used in LTE.

Referring to FIG. 7, the uplink subframe includes a plurality of slots (e.g., two). The number of SC-FDMA symbols included in one slot may be changed according to the length of a CP. For example, in the case of the normal CP, the slot may include seven SC-FDMA symbols. The uplink subframe is divided into a data region and a control region in a frequency domain. The data region includes a PUSCH and is used to transmit a data signal such as voice data. The control region includes a PUCCH and is used to transmit control information. The PUCCH includes RB pairs (e.g., m=0, 1, 2, 3) located at both ends of the data region on a frequency axis and hops between slots. The control information includes HARQ ACK/NACK, channel quality information (CQI), precoding matrix indicator (PMI), rank indication (RI), etc.

Figure 8:
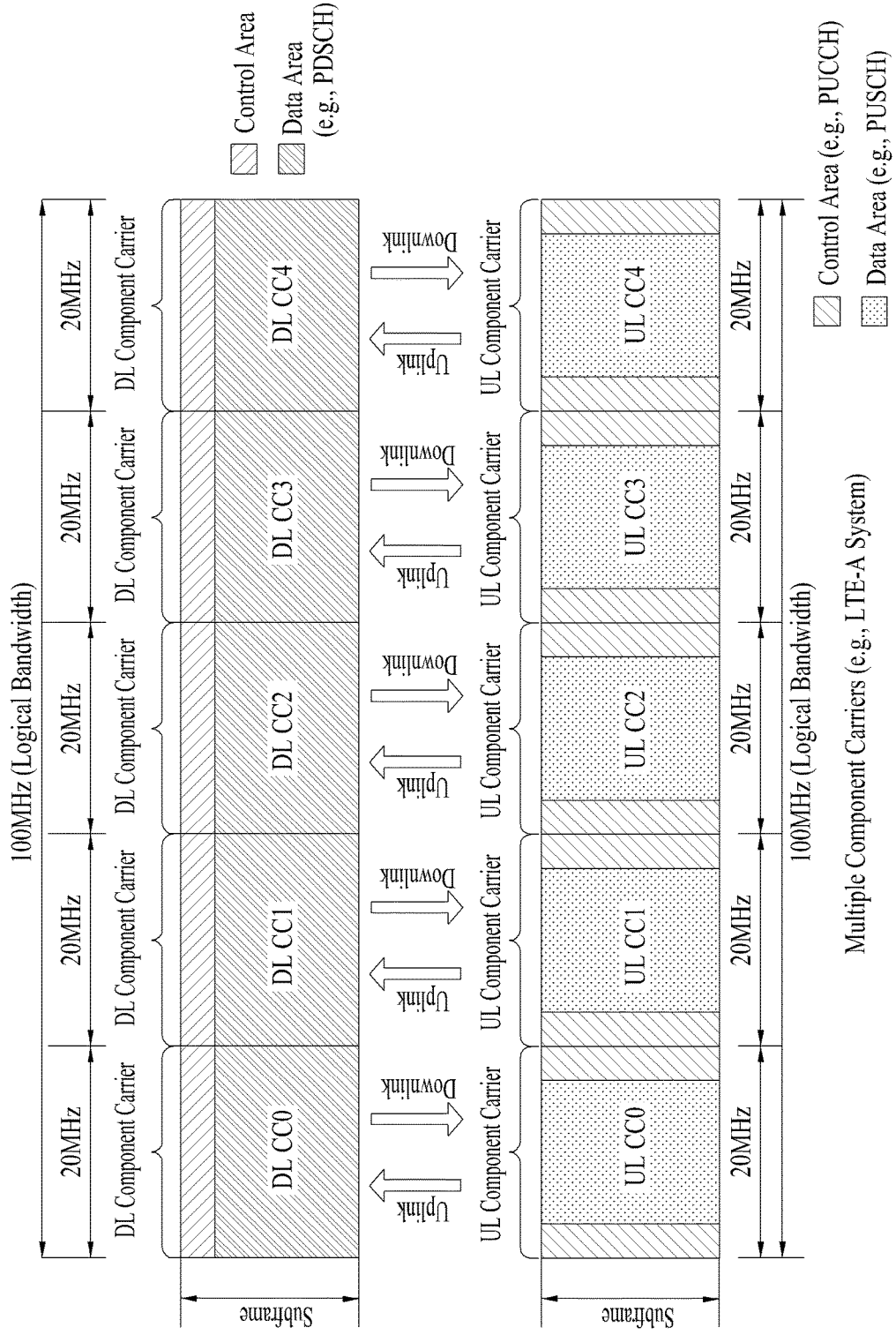
FIG. 8 is a diagram showing a carrier aggregation (CA) communication system.

FIG. 8 is a diagram showing a carrier aggregation (CA) communication system.

Referring to FIG. 8, a plurality of uplink/downlink Component Carriers (CCs) may be aggregated so as to support a wider uplink/downlink bandwidth. The CCs may be contiguous or non-contiguous in a frequency domain. The bandwidths of the CCs are independently set. Asymmetric CA in which the number of UL CCs and the number of DL CCs are different is also possible. The control information may be set to be transmitted/received only through a specific CC. Such a specific CC may be referred to as a primary CC and the remaining CCs may be referred to as secondary CCs. For example, if cross-carrier scheduling (or cross-CC scheduling) is applied, a PDCCH for downlink allocation may be transmitted through DL CC#0 and a corresponding PDSCH may be transmitted through DL CC#2. The term "CC" may be replaced with other equivalent terms (e.g., carrier, cell and the like).

For cross-CC scheduling, a carrier indicator field (CIF) is used. Setting presence/absence of the CIF in the PDCCH may be enabled through higher layer signaling (e.g., RRC signaling in a semi-static and UE-specific (or UE-group-specific) manner. The basic matters of PDCCH transmission are summarized as follows.

CIF disabled: A PDCCH on a DL CC is allocated PDSCH resources on the same DL CC and PUSCH resources on a single linked UL CC.
        No CIF
    CIF enabled: A PDCCH on a DL CC may be allocated PDSCH or PUSCH resources on one of a plurality of merged DL/UL CCs using a CIF.
        LTE DCI format extended to have a CIF
            CIF (if set) is a fixed x-bit field (e.g., x=3)
                The position of the CIF (if set) may be fixed regardless of a DCI format size.

If the CIF is present, an eNB may allocate a monitoring DL CC (set) in order to reduce BD complexity of a UE. For PDSCH/PUSCH scheduling, a UE may detect/decode a PDCCH only in a corresponding DL CC. In addition, the eNB may transmit a PDCCH only through the monitoring DL CC (set). The monitoring DL CC set may be set in a UE-specific, UE-group-specific or cell-specific manner.

Figure 9:
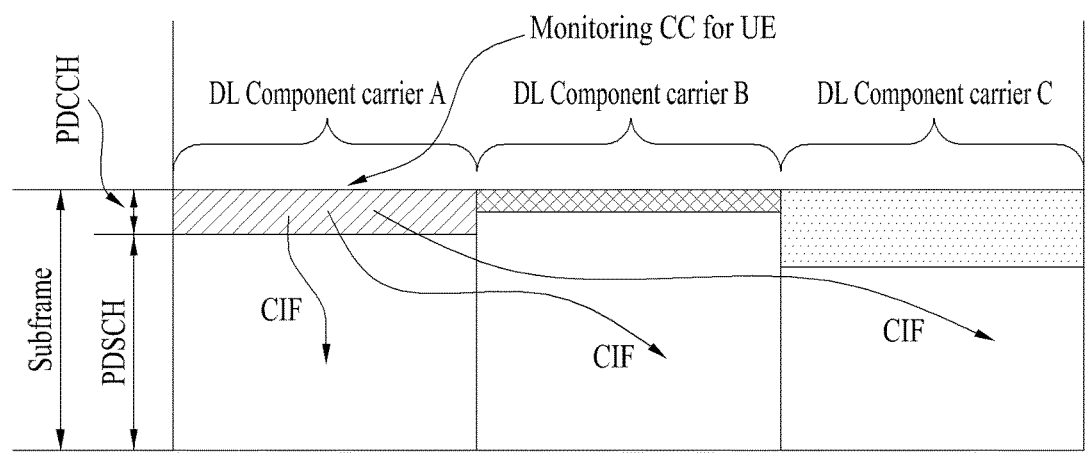
FIG. 9 is a diagram showing cross-carrier scheduling.

FIG. 9 shows the case in which three DL CCs are merged and a DL CC A is set to a monitoring DL CC. If a CIF is disabled, each DL CC may transmit a PDCCH for scheduling a PDSCH of each DL CC without the CIF according to an LTE PDCCH rule. In contrast, if the CIF is enabled through higher layer signaling, only the DL CC A may transmit the PDCCH for scheduling not only the PDSCH of the DL CC A but also the PDSCHs of the other DL CCs. The PDCCH is not transmitted through the DL CCs B and C, both of which are not set as the monitoring DL CC. The term "monitoring DL CC" may be replaced with the term monitoring carrier, monitoring cell, scheduling carrier, scheduling cell, serving carrier, or serving cell.

Figure 10:
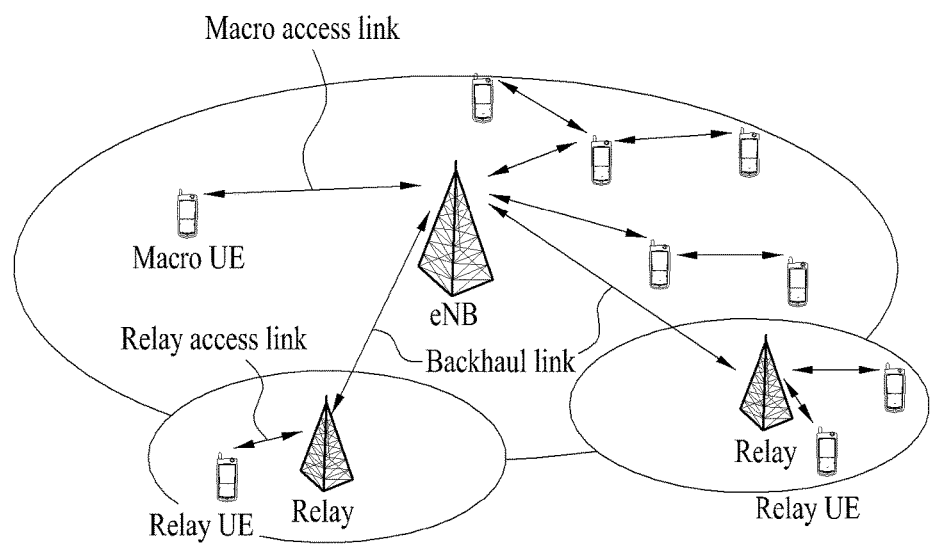
FIG. 10 is a diagram showing a wireless communication system including a relay.

FIG. 10 is a diagram showing a wireless communication system including a relay. The wireless communication system includes an eNB, a relay (or a relay node (RN)) and a UE. The UE performs communication with the eNB or the relay. For convenience, a UE which performs communication with the eNB is referred to as a macro UE and a UE which performs communication with the relay is referred to as a relay UE. A communication link between an eNB and a macro UE is referred to as a macro access link and a communication link between a relay and a relay UE is referred to as a relay access link. A communication link between an eNB and a relay is referred to as a backhaul link.

Figure 11:
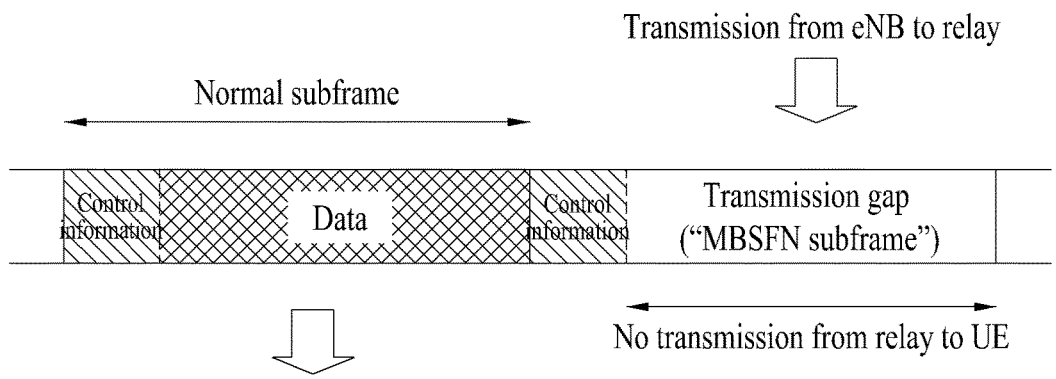
FIG. 11 is a diagram showing an example of performing backhaul transmission using a multicast broadcast single frequency network (MBSFN) subframe.

FIG. 11 is a diagram showing an example of performing backhaul transmission using a multicast broadcast single frequency network (MBSFN) subframe. In the case in which a relay transmits a signal to a UE while receiving a signal from an eNB and vice versa, a transmitter and a receiver of the relay cause interference. Thus, simultaneous transmission and reception may be restricted. Therefore, the backhaul link and the relay access link are partitioned using a TDM scheme. An LTE-A system establishes a backhaul link in one subframe signaled through an MBSFN subframe (fake MBSFN method). In the case in which an arbitrary subframe is signaled through an MBSFN subframe, since a UE receives only a control region of the subframe, a relay may configure a backhaul link using the data region of the subframe. For example, a third OFDM symbol of the MBSFN subframe and OFDM symbols subsequent thereto may be used for transmission between the eNB and the relay (that is, backhaul transmission).

As shown in FIG. 11, if a backhaul subframe and a relay access subframe are partitioned in one CC using a TDM scheme, backhaul transmission timing is restricted in the CC. Accordingly, the backhaul subframe of FIG. 11 may be referred to as a half-duplex backhaul subframe. In contrast, unlike FIG. 11, a backhaul-dedicated CC may be set. That is, only a backhaul subframe may be set in one CC and backhaul transmission is always possible in the CC. A backhaul subframe of a backhaul-dedicated CC may be referred to as a full-duplex backhaul subframe.

Figure 12:
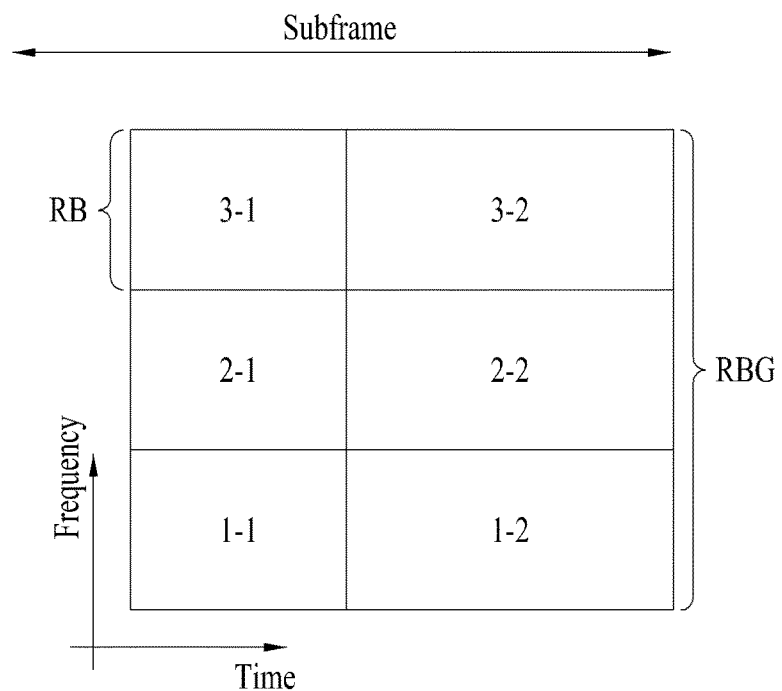
FIG. 12 is a diagram showing an example of arbitrarily dividing frequency-time resources for a relay.

FIG. 12 is a diagram showing an example of dividing frequency-time resources (that is, backhaul resources) for a relay. FIG. 12 shows part of a downlink subframe. More specifically, FIG. 12 shows a part excluding the control region in the MBSFN subframe of FIG. 11.

In FIG. 12, the size of frequency-time resources denoted by X-Y (X=1, 2, 3; Y=1, 2) may be variously configured. For example, X-Y may correspond to a resource block (RB). The RB refers to a physical resource block (PRB) or a virtual resource block (VRB). In this case, X-1 corresponds to a part of an RB of a first slot and X-2 corresponds to an RB of a second RB. [X-1, X-2] corresponds to an RB pair. In the following description, the RB may mean [X-1], [X-2] or [X-1, X-2] according to context. An RBG is composed of one or more contiguous RBs. The number of RBs configuring the RBG may be changed according to system band.

Figure 13:
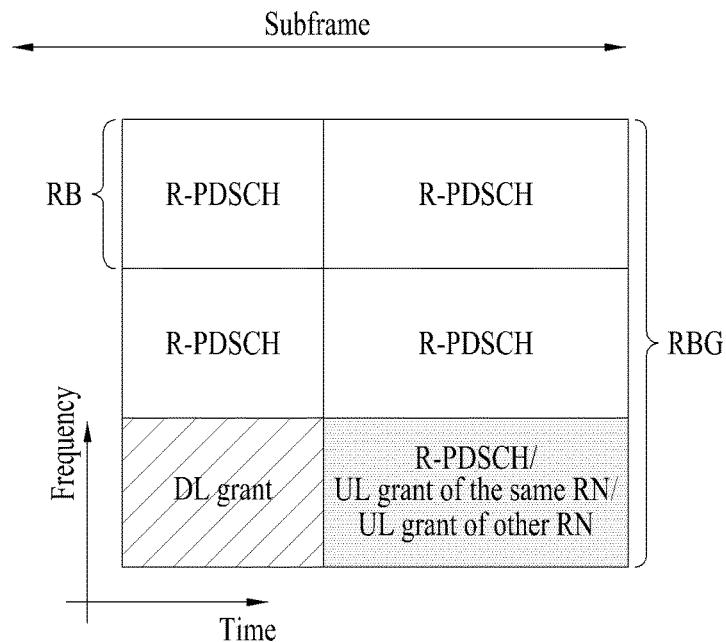
FIG. 13 is a diagram showing an example of allocating an R-PDCCH/(R-)PDSCH.

FIG. 13 is a diagram showing an example of allocating an R-PDCCH/(R-)PDSCH to frequency-time resources of FIG. 12. Control information is transmitted through the R-PDCCH and data is transmitted through the (R-)PDSCH. The R-PDCCH carries downlink scheduling information (e.g., DL grant) and/or uplink scheduling information (e.g., UL grant). The basic unit of the R-PDCCH is a CCE. The CCE may be defined as one or a plurality of REGs, one or a plurality of RBs or one or a plurality of RBGs.

Referring to FIG. 13, if DL grant of RN #1 is present in a resource region 1-1 (see FIG. 12), (a) data ((R-)PDSCH), (b) UL grant and (c) UL grant for another RN may be present in a resource region 1-2 (see FIG. 12). A determination as to which of (a) to (c) is present in the resource region 1-2 may be made using RA information (e.g., RBG or RB allocation information) of the DL grant. For example, if all RBGs are allocated to RN #1, RN #1 may interpret RA information of the DL grant and determine whether the resource region 1-2 corresponds to (a) or (b).

Similarly to a relay system, PDCCH transmission using a data region (e.g., a PDSCH region) of a subframe between an eNB and a UE and between a relay and a UE is being discussed. For example, the amount of PDCCHs to be transmitted by a specific cell (e.g., through a monitoring CC) is gradually increased due to a cross-carrier scheduling situation, etc., but the size of the control region is not increased.

Figure 14:
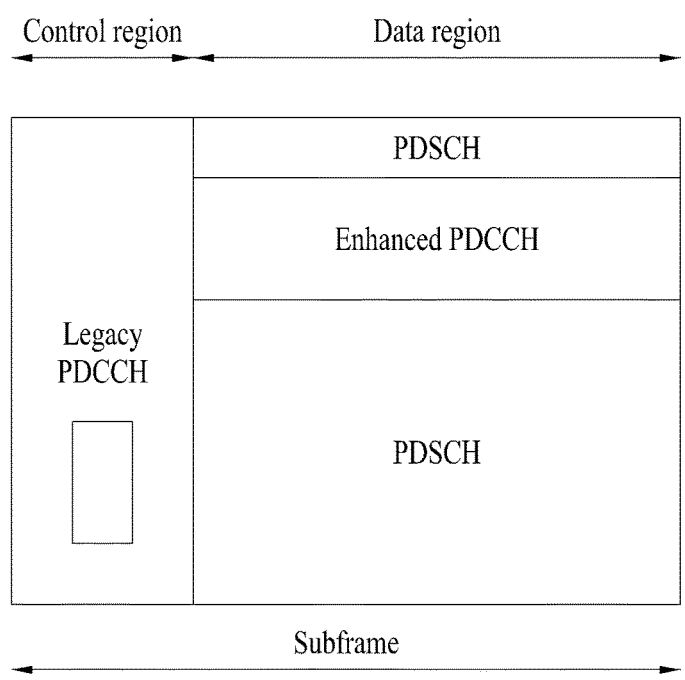
FIG. 14 is a diagram showing another example of allocating a PDCCH to a data region (e.g., a PDSCH region) of a subframe.

FIG. 14 is a diagram showing another example of allocating a PDCCH to a data region (e.g., a PDSCH region) of a subframe. Referring to FIG. 14, a PDCCH (for convenience, a legacy PDCCH) of the legacy LTE may be allocated to the control region of the subframe. A PDCCH may be additionally allocated using some resources of the data region. For convenience, the PDCCH allocated to the data region is referred to as an enhanced PDCCH (E-PDCCH). FIG. 14 shows the case in which one E-PDCCH is applied to an entire data region. However, this is only exemplary and the E-PDCCH may be present in slot units as shown in FIG. 13. That is, as shown in FIG. 13, an E-PDCCH for DL grant may be transmitted via a first slot and an E-PDCCH for UL grant may be transmitted via a second slot.

Hereinafter, a method of allocating and managing resources for a downlink control channel using a data region (e.g., a PDSCH) of a subframe will be described with reference to the figures. For convenience, although a relay system is described in the following description, as shown in FIG. 14, the present invention is equally/similarly applicable to an eNB-UE or relay-UE. Accordingly, in the following description, eNB-relay may be replaced with an eNB-UE or relay-UE. In a view of signal reception, the relay and the UE may be generalized as being a receiver. In addition, in the following description, an R-PDCCH may be replaced with an E-PDCCH of FIG. 14. The R-PDCCH and the E-PDCCH may be collectively referred to an X-PDCCH, as a term for distinguishing them from the legacy PDCCH.

First, an R-PDCCH and a PDSCH will be described in detail. The R-PDCCH carries a DCI for a relay. For detailed information about the DCI, refer to the description of Table 1. For example, the R-PDCCH may carry downlink scheduling information and uplink scheduling information for a relay. Downlink data (e.g., backhaul data) for a relay is received via a PDSCH. A communication procedure of an R-PDCCH/PDSCH is equal or similar to the description of step S102 of FIG. 1. That is, the relay receives the R-PDCCH and receives data/control information through a PDSCH indicated by the R-PDCCH. R-PDCCH transmission processing (e.g., channel coding, interleaving, multiplexing, etc.) may be performed using processing (see FIGS. 5 to 6) defined in the legacy LTE within a possible range and may be modified as necessary. For example, in consideration of relay characteristics, unnecessary procedures of processing defined in the legacy LTE may be omitted in R-PDCCH transmission processing.

The relay performs operation such as PDSCH decoding/demodulation based on control information obtained from the R-PDCCH. Accordingly, it is important to accurately obtain R-PDCCH information. The legacy LTE employs a scheme for reserving a PDCCH candidate region (PDCCH search space) within the control region and transmitting a PDCCH of a specific UE in a part of the reserved region. Accordingly, the UE may obtain a PDCCH thereof within the PDCCH search space through Blind Decoding (BD). Similarly, a relay may also employ a scheme for transmitting an R-PDCCH over some or all reserved resources.

Figure 15:
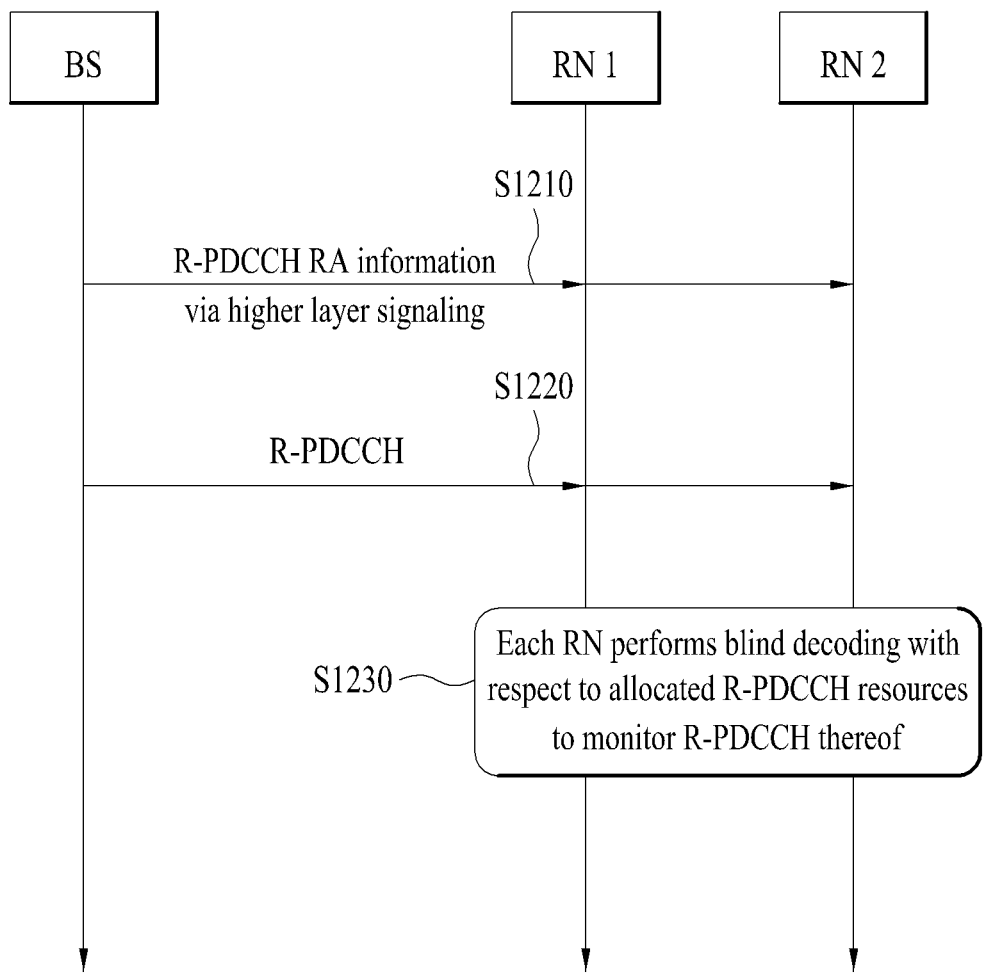
FIG. 15 is a diagram showing a resource allocation and PDCCH reception procedure for an R-PDCCH.

FIG. 15 is a diagram showing a resource allocation and PDCCH reception procedure for an R-PDCCH.

Referring to FIG. 15, a base station (BS) transmits R-PDCCH resource allocation (RA) information to a relay node (RN) (S1210). The R-PDCCH RA information may include RB (or VRB) allocation information. RB allocation information may be provided in RB units or RBG units. R-PDCCH RA information may be transmitted through higher layer (e.g., RRC) signaling. The R-PDCCH RA information is used to reserve R-PDCCH resources (regions). Thereafter, the BS transmits the R-PDCCH via a backhaul subframe (S1220). The R-PDCCH may be transmitted in a part or all of R-PDCCH resources (e.g., M RBs) reserved in step S1210. Accordingly, the RN monitors resources (regions) (hereinafter, referred to as an R-PDCCH search space (SS) or an SS) in which the R-PDCCH may be transmitted (S1230). More specifically, the RN performs BD with respect to a plurality of R-PDCCH candidates within the search space.

Meanwhile, DCIs (e.g., DL grant and UL grant) mapped to R-PDCCH resources (e.g., RBs) may not be cross-interleaved. In this case, only one R-PDCCH is transmitted via one or more RBs. In addition, DCIs mapped to R-PDCCH resources may be subjected to intra-RB interleaving. Alternatively, DCIs mapped to R-PDCCH resources may be subjected to inter-RB interleaving. In this case, a plurality of R-PDCCHs may be transmitted via one or more RBs.

Figure 16:
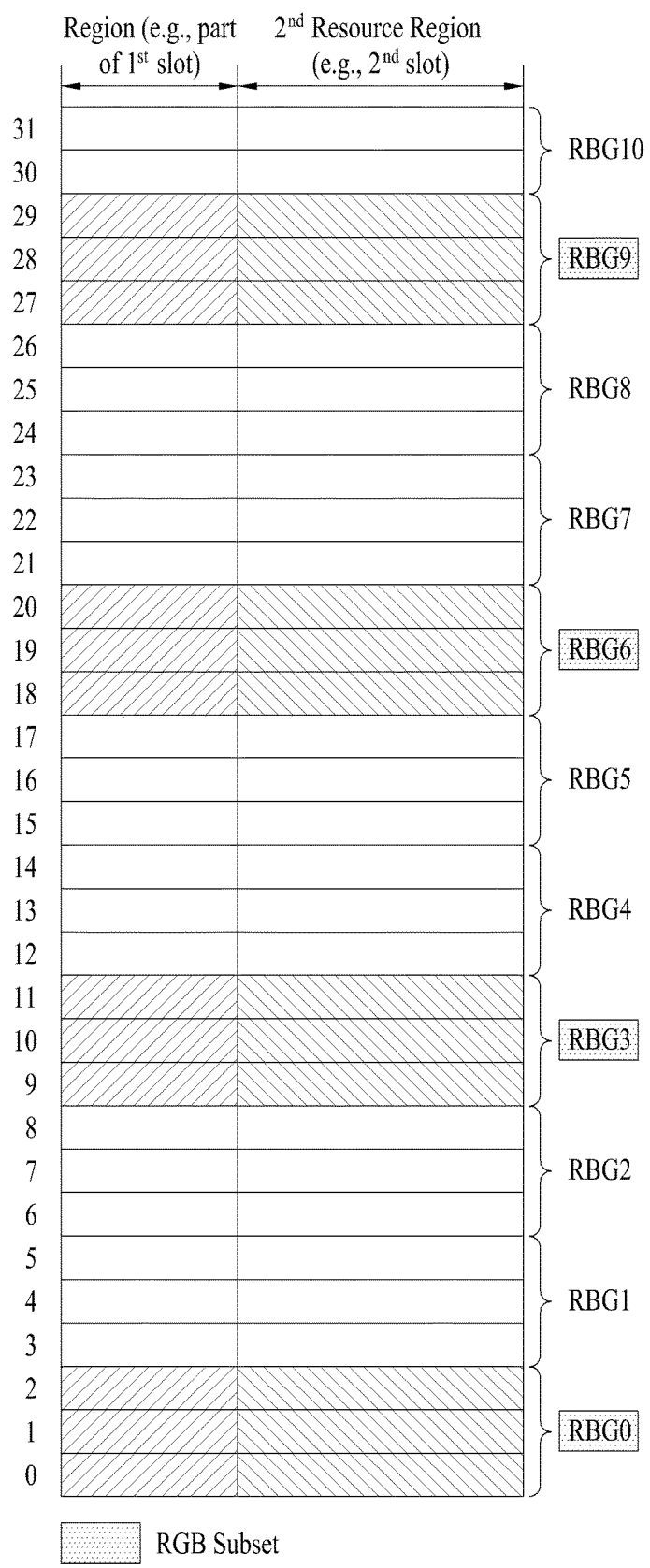
FIG. 16 is a diagram showing an example of configuring a search space for an R-PDCCH.

FIG. 16 is a diagram showing an example of configuring an SS. The present example shows the case in which R-PDCCH RA information of FIG. 15 includes RBG allocation information. Referring to FIG. 16, RBGs 0, 3, 6 and 9 are set as an SS and a relay performs BD at RBGs 0, 3, 6 and 9 in order to receive an R-PDCCH thereof. FIG. 16 shows the case in which the SS uses the same resources (e.g., RBs or RBGs) in subframe units. Alternatively, the SS may be independently defined per slot.

Hereinafter, a method of configuring an SS in the case of using a plurality of component carriers (CCs) will be described. For convenience, it is assumed that three CCs (e.g., PCC, SCC1 and SCC2) are configured.

FIGS. 17 to 20 are diagrams showing examples of configuring an SS in the case in which cross-carrier scheduling is set in a CA system. The present example may correspond to the case in which CC SSs are implicitly arranged using one signal for an SS size (e.g., 16 VRBs (CCEs)) of a PCC. In the present example, it is assumed that three CCs (e.g., PCC, SCC1 and SCC2) are configured (or activated). In the case of cross-carrier scheduling, the SS is configured per each CC and may be present only in a monitoring CC (or a scheduling CC). Hereinafter, the SS which is configured per a CC is referred to as a CC SS (or an individual SS). The monitoring CC (or the scheduling CC) may be set to a PCC. In order to aid in understanding, in the present example, it is assumed that an RB (or a VRB) is provided as a CCE. Accordingly, if a CCE aggregation level is N, one R-PDCCH is composed of N RBs (or VRBs).

Table 5 shows a CC SS size in the case in which a CCE aggregation level and the number of R-PDCCH candidates corresponding thereto are provided as shown in Table 1.

TABLE 5

| R-PDCCH format | Number of CCEs (n) | Number of R-PDCCH candidates within CC SS | CC SS size (Number of VRBs) |
|---|---|---|---|
| 0 | 1 | 6 | 6 |
| 1 | 2 | 6 | 12 |
| 2 | 4 | 2 | 8 |
| 3 | 8 | 2 | 16 |

Figure 17:
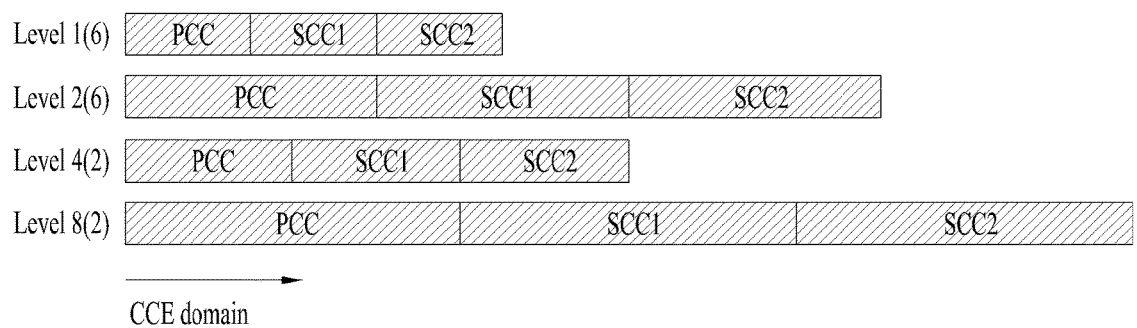
FIGS. 17 to 20 are diagrams showing examples of configuring a search space for an R-PDCCH in a CA situation.
Figure 18:
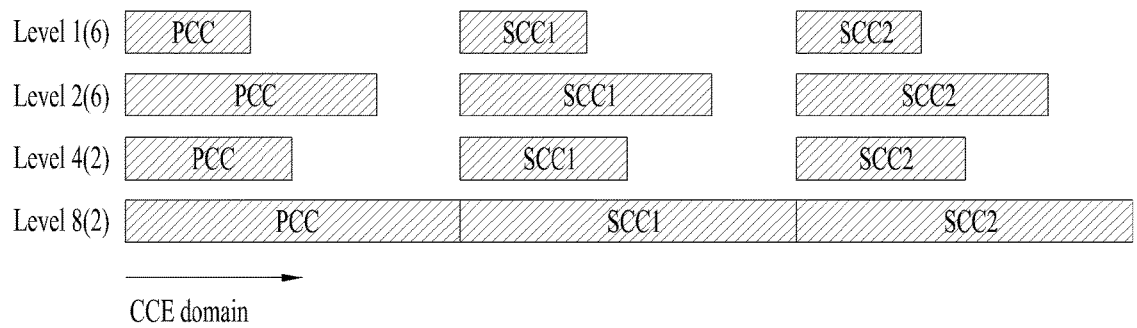

FIGS. 17 to 18 show the case of configuring all SSs only using SSs of configured (or activated) CCs. CIF values of the configured (or activated) CCs are sorted in ascending (or descending) index order and the CC SSs may be contiguous in this order. For convenience, CIF values of 0, 1 and 3 are allocated to PCC, SCC1 and SCC2, respectively. If the CIF values are sorted in ascending index order, as shown in FIGS. 17 and 18, CC SSs are contiguously arranged starting from a CC having a low CIF value, to configure all SSs (that is, CIF #0→CIF #1→CIF #3; PCC SS→SCC1 SS→SCC2 SS). FIG. 17 shows the case in which CC SSs are contiguously arranged according to CC aggregation level and FIG. 18 shows the case in which CC SSs are contiguously arranged in VRB (CCE) units.

Figure 19:
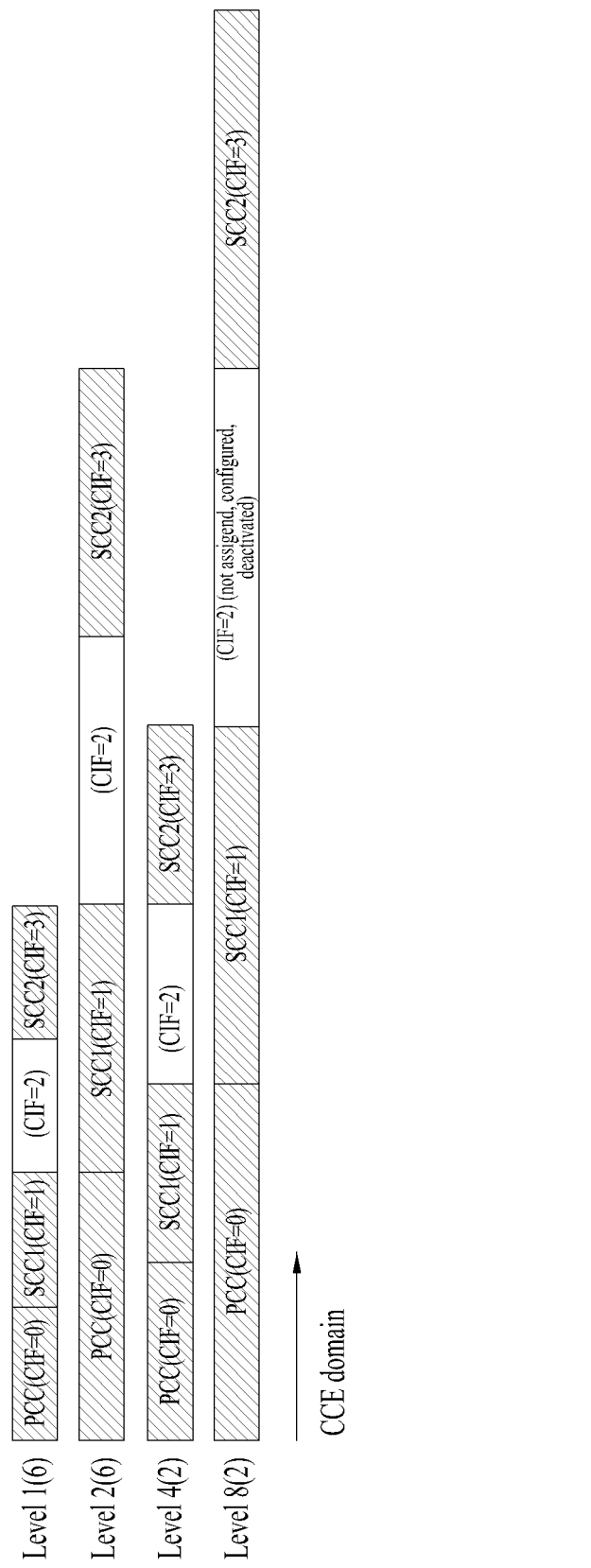
Figure 20:
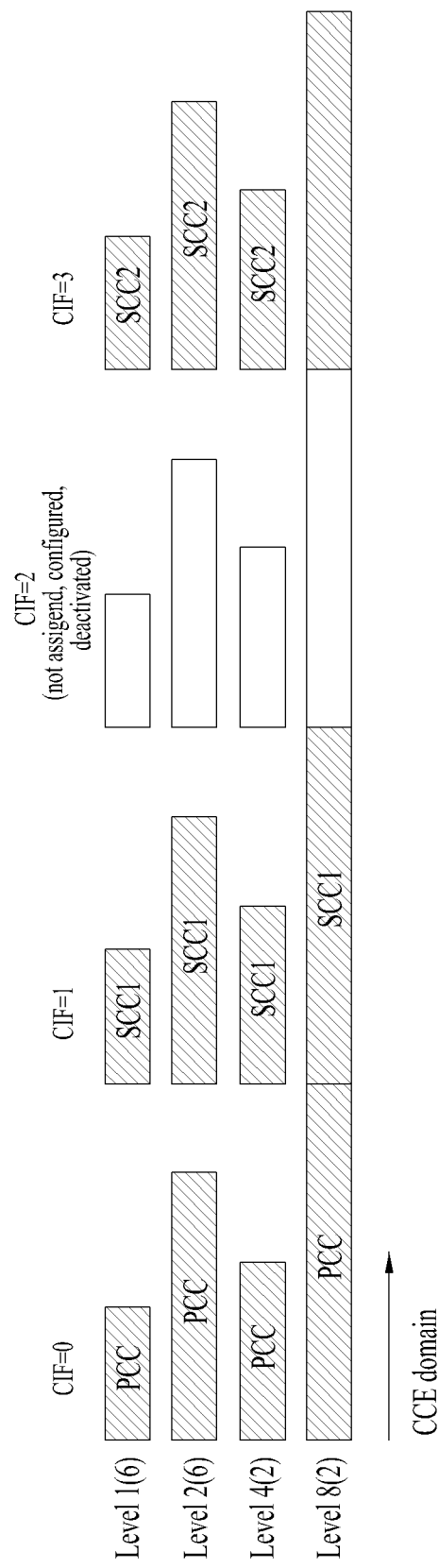

FIGS. 19 to 20 show the case in which CC SSs corresponding to unused CIF values are included to configure all SSs. The unused CIF value includes the case in which a corresponding CC is not configured or is deactivated. For example, the unused CIF value may mean a non-allocated CIF value among all configurable CIF values (or CCs). In addition, the unused CIF value may mean a CIF value corresponding to a deactivated CC among configured CIF values. All SSs are configured by contiguously arranging CC SSs corresponding to the CIF values in descending (or ascending) index order and CC SSs corresponding to the unused CIF values may be concatenated in an empty state. For convenience, it is assumed that CIF values of 0, 1 and 3 are allocated to PCC, SCC1 and SCC2. If the CIF values are sorted in ascending index order, as shown in FIGS. 19 to 20, CC SSs may be contiguously arranged from a CC having a low CIF value to configure all SSs (that is, CIF #0→CIF #1→CIF #2→CIF #3; PCC SS→SCC1 SS→non-available SS→SCC2 SS). FIG. 19 shows the case in which CC SSs are contiguously arranged according to CCE aggregation level and FIG. 20 shows the case in which CC SSs are contiguously arranged in units of 16 VRBs (CCEs).

In FIGS. 17 to 20, all three CC SSs are used for R-PDCCH transmission in one subframe. However, some CC SSs may not be used for R-PDCCH transmission in a specific subframe. For convenience, a CC SS which is used for R-PDCCH transmission in a subframe k (k being an integer) is referred to as an active CC SS (or a used CC SS) and a CC SS which is not used for R-PDCCH transmission is referred to as an idle CC SS (or an unused CC SS).

Figure 21:
FIG. 21 is a diagram showing the case in which an idle search space is generated.

FIG. 21 is a diagram showing the case in which an idle CC SS occurs in a specific subframe in a state in which a plurality of CCs is configured and cross-carrier scheduling is set. In Case 1, B indicates that backhaul transmission is possible and X indicates that backhaul transmission is impossible. In Case 2, A indicates that a CC is activated and DA indicates that a CC is deactivated. In Case 3, U indicates an uplink subframe and D indicates a downlink subframe.

Referring to FIG. 21, the idle CC SS may be generated when backhaul subframe patterns differ between CCs (Case 1). For example, as shown, DL backhaul transmission of a scheduling CC (e.g., PCC) may be possible, but DL backhaul transmission of a scheduled CC (e.g., SCC) may not be possible in the same subframe (e.g., subframe #7). In this case, since cross-carrier scheduling for SCC is impossible, the SCC SS is not used in the PCC of subframe #7. In addition, the idle CC SS may be generated by SCC deactivation (Case 2). If SCC is deactivated (e.g., in subframes #4 to #7), cross-carrier scheduling from the PCC to the SCC of the corresponding subframes is impossible. Accordingly, the SCC SS is not used in the PCC of subframes #4 to #7. In addition, In addition, the idle CC SS may be generated if TDD configurations differ between CCs (Case 3). Due to different TDD configurations, DL transmission may be possible in a scheduling CC (e.g., PCC), but DL transmission may not be possible in a scheduled CC (e.g., SCC) in the same subframe (e.g., subframe #3/#4). In this case, since cross-carrier scheduling to SCC is impossible, the SCC SS is not used in the PCC of subframe #3/#4.

In the example of FIG. 21, Case 1 corresponds to only a relay system and Cases 2 and 3 correspond to a relay system and a general eNB-UE system. In addition, a combination of Case 1 and Case 2 or a combination of Case 2 and Case 3 is possible.

As described with reference to FIG. 15, since an SS is configured in a semi-static manner through higher layer signaling, it is impossible to dynamically change SS resources every subframe in consideration of RN load. Accordingly, there is a need for a method of efficiently configuring/allocating SS resources (regions) within restricted resources. In addition, as shown in FIG. 21, if an idle SS is generated in a specific subframe, R-PDCCH transmission is not performed through the idle SS and thus resources may be wasted. As the idle SS is increased, deficiency of SS regions may be worsened. Accordingly, there is a need for a method of efficiently utilizing idle SS resources (regions).

Hereinafter, methods of efficiently configuring/allocating SS resources (regions) for cross-carrier scheduling in the case in which a plurality of CCs is configured will be described with reference to the drawings.

Embodiment 1: Search Space Sharing

For efficient use of SS resources, CC SSs are configured to overlap each other. However, excessive overlapping may increase a probability that R-PDCCH candidates collide. In order to solve this problem, in the present example, an SS sharing method is proposed. SS sharing means that a plurality of CC SS resources (regions) is shared. In this case, R-PDCCH candidates may be transmitted not only using a CC SS thereof but also using shared SS resources (regions).

Figure 22:
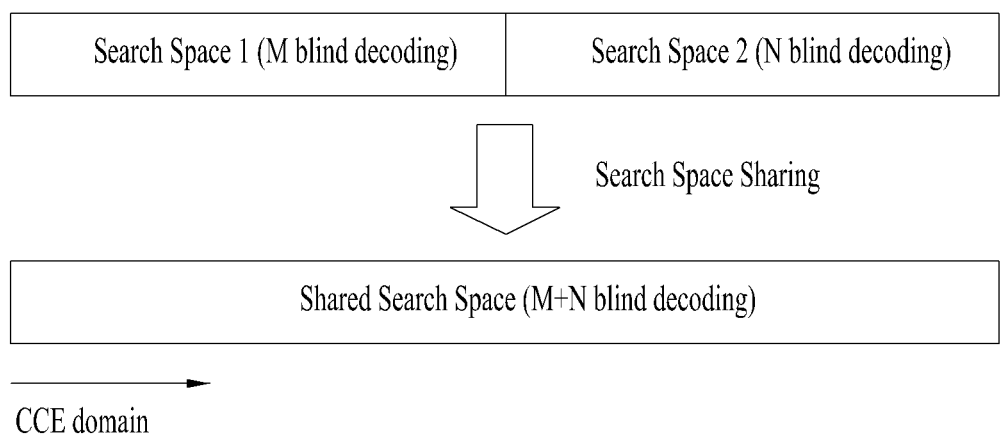

FIG. 22 shows SS sharing according to an embodiment of the present invention. Although two CC SS are shared in the present example, three or more CC SS may be shared. In the drawing, it is assumed that SS1 is for CC1 and SS2 is for CC2. A CC SS is referred to as an individual SS to be distinguished from the shared SS.

Referring to FIG. 22, fundamentally, an SS is individually configured per CC and an R-PDCCH may be detected only within an SS of a corresponding CC. That is, an R-PDCCH for CC1 (hereinafter, CC1 R-PDCCH) may be transmitted only in SS1 and an R-PDCCH for CC2 (hereinafter, CC2 R-PDCCH) may be transmitted only in SS2. According to the present example, if a predetermined condition is satisfied, SS1 and SS2 may be shared. In this case, the CC1 R-PDCCH candidate may be transmitted in either SS1 or SS2 and the CC2 R-PDCCH candidate may be transmitted in either SS1 or SS2. SS sharing may be applied to an RN-specific SS. It is possible to determine to which CC an R-PDCCH detected in the shared SS corresponds using a CIF field.

The predetermined condition includes the same (payload) size of control channel information in corresponding CC SSs. The predetermined condition includes the same identification information included in control channel information in corresponding CC SSs. For example, the predetermined condition may include the same DCI format size in corresponding CC SSs and further include the same RNTI (e.g., C-RNTI) used in CRC scrambling a DCI format. The DCI format size may be changed according to frequency band and DCI format of a corresponding CC.

If the predetermined condition is satisfied, even when a plurality of CC SSs is shared, the number of times of BD is not increased. In contrast, since an SS size is increased by SS sharing, a degree of freedom in scheduling of an R-PDCCH can be increased, thereby reducing an R-PDCCH blocking probability.

FIG. 23 shows R-PDCCH transmission upon SS sharing and BD associated therewith. In the present example, it is assumed that SSs corresponding to three CCs (or CIFs) are configured. The size of each CC SS and CCE aggregation levels of R-PDCCH candidates in each CC SS may be independently given. R-PDCCHs (or R-PDCCH candidates) (CIF=CC #X) (X=1, 2, 3) have the same DCI format or different DCI formats.

Case 1 of FIG. 23 shows the case in which all CC SSs are shared. Accordingly, as shown, R-PDCCH candidates may be transmitted via any CC SS. Accordingly, on the assumption that R-PDCCHs (or R-PDCCH candidates) (CIF=CC #X) (X=1, 2, 3) may be transmitted via CC #1 SS, CC #2 SS or CC #3 SS, a relay performs BD with respect to R-PDCCH candidates of CC #1 to #3 SSs in order to find an R-PDCCH (CIF=CC #X) (X=1, 2, 3).

Case 2 of FIG. 23 shows the case in which CC SSs are partially shared. For convenience, it is assumed that SSs for CC #1/CC #3 are shared. In this case, R-PDCCHs (or R-PDCCH candidates) (CIF=CC #X) (X=1, 3) may be transmitted via any shared CC SS. Accordingly, on the assumption that R-PDCCHs (or R-PDCCH candidates) (CIF=CC #X) (X=1, 3) may be transmitted via CC #1 SS or CC #3 SS, a relay performs BD with respect to R-PDCCH candidates of CC #1/CC #3 SSs. The relay performs BD only with respect to the R-PDCCH candidates of CC #2 SS in order to find an R-PDCCH (CIF=CC #X) (X=2).

FIGS. 24 to 27 show other examples of configuring an SS using SS sharing. For SS sharing, as described above, a predetermined condition should be satisfied. For example, the same DCI format size is used in every CC. A method of sharing only CC SSs satisfying the predetermined condition or forcibly satisfying the predetermined condition for SS sharing may be considered. For example, in the latter case, the DCI format sizes used in CC SSs to be shared may be forcibly equalized. For example, padding bits (or dummy bits) may be added to payload of other DCI formats according to a DCI format having the largest size.

Figure 24:
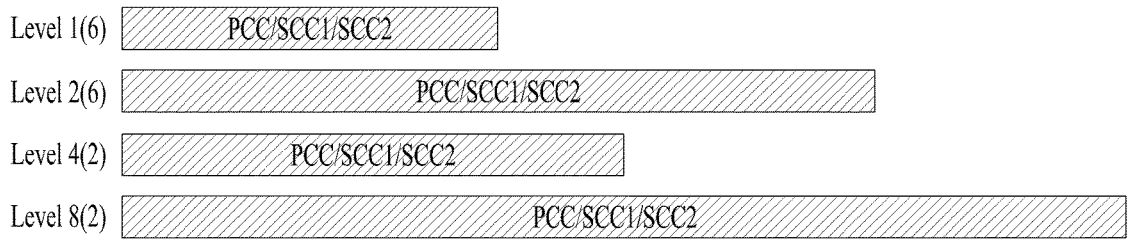
Figure 25:
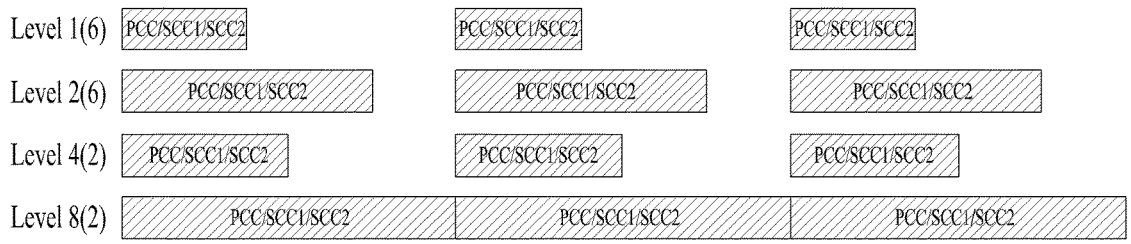

FIGS. 24 to 27 show the case in which all three CC SSs satisfy the predetermined condition for SS sharing or the case in which the DCI format sizes of all CC SSs are equalized for SS sharing. FIGS. 24 and 25 shows the case in which three CCs are configured and all SSs for the three CCs may be used in one subframe. FIG. 24 shows the case in which CC SSs are contiguously arranged according to CCE aggregation level and FIG. 25 shows the case in which CC SSs are contiguously arranged in units of 16 VRBs (CCEs).

Figure 26:
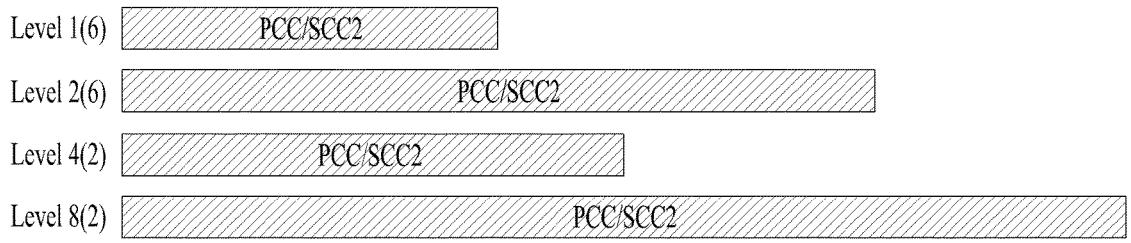
Figure 27:
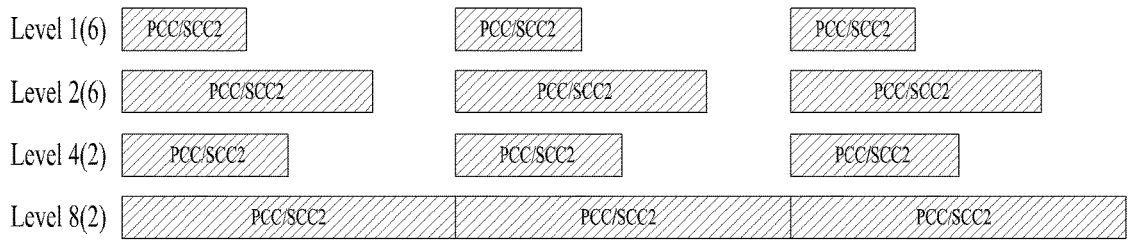

FIGS. 26 and 27 show the case in which three CCs are configured and only two CC SSs may be used in one subframe. That is, an idle CC SS is present. In the present examples, SS sharing including the idle CC SS (e.g., SCC1 CC) is made. In this case, since R-PDCCH candidates for SCC1 are not transmitted, only the DCI format sizes of PCC SS and SCC2 SS are equalized for SS sharing. FIG. 26 shows the case in which CC SSs are contiguously arranged according to CCE aggregation level and FIG. 27 shows the case in which CC SSs are contiguously arranged in units of 16 VRBs (CCEs). FIGS. 26 to 27 may show a case that CC SSs are independently used, but if a specific CC SS becomes not used, the idle CC SS may be merged into the entire SS through SS sharing.

FIGS. 24 to 27 show the case in which start points of CC SSs are equally given at all CCE aggregation levels. However, this is only exemplary and the start points of the CC SSs may be differently set according to CCE aggregation levels in order to increase resource allocation flexibility and reduce an R-PDCCH blocking probability. Differently setting the start points of the CC SSs according to CCE aggregation levels may be equally applied to the following examples.

In the above description, a method of configuring individual SSs and then sharing the plurality of individual SSs according to situations is focused upon. In contrast, one large SS may be set according to the number of CCs (e.g., if the number of CCs is N, SS size is set to N times CC SS size) and PCC and SCC(s) may share the SS. If the SS size exceeds available SS resources, the SS may be connected to a front portion of the SS resources using a circulation method.

Next, a relay operation according to CC (or cell) activation/deactivation will be described with reference to FIG. 28. Deactivation means that a corresponding CC (or cell) is not used and activation means that a corresponding CC (or cell) is used. For example, an R-PDCCH monitoring operation and a PDCCH reception operation may be performed only in an activated CC. A CC to be activated/deactivated is limited to the SCC.

Figure 28:
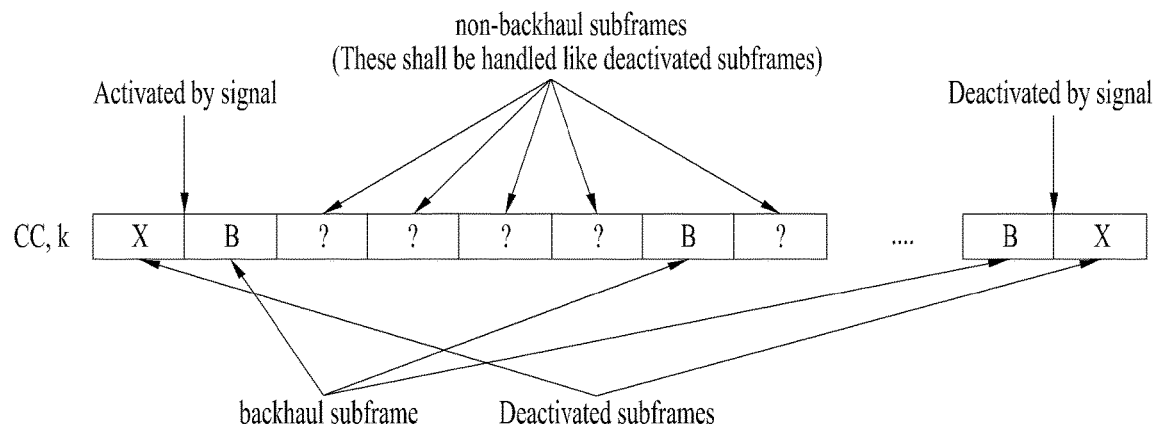

Referring to FIG. 28, if a relay receives an activation signal (e.g., an L1/L2 or higher layer signal (e.g., an RRC signal)) with respect to a specific CC among configured CCs (e.g., PCC, SCC1 and SCC2), the relay knows that the CC is used. Even when a CC is activated, a specific subframe (e.g., non-backhaul subframe) of the CC may not be used according to backhaul subframe configuration.

The relay may operate at a subframe k (k being an integer) on the following assumption.

If a specific CC is deactivated, backhaul transmission via the CC cannot be performed. For example, even when a subframe k of the CC is set as a backhaul subframe, backhaul transmission is impossible in a deactivated state.

Although a specific CC is activated, if a specific subframe (that is, a subframe k) of the CC is not used as a backhaul subframe (e.g., a non-backhaul subframe), the operation of this subframe may be equal to that when a deactivated signal is received. For convenience, the specific subframe is referred to as a deactivation subframe.

If a deactivation CC (or a deactivation subframe) is present, blind decoding is not performed with respect to the SS of the CC in a scheduling CC (skipping). In this case, the SS of the CC may be used to increase the SS size of another CC through SS sharing as shown in FIGS. 26 and 27. In contrast, a method of utilizing the SS of the CC to transmit data may be considered. For example, if a deactivation CC (or a deactivation subframe) is present, the SS of the CC is regarded as not being on a scheduling CC and thus resources for the SS of the CC may be used for PDSCH transmission.

Alternatively, the relay may operate using a method opposite to the above description. That is, a deactivation signal may be a default value in a backhaul subframe. For this end, all CCs are set to be deactivated in terms of backhaul transmission. Thereafter, in the case of a subframe which may actually be used as a backhaul subframe, only when being activated as described above, the subframe is regarded as a backhaul subframe so as to perform an operation for receiving a backhaul signal via the CC (e.g., CC SS monitoring). Alternatively, a half-duplex backhaul subframe or a special-purpose subframe (e.g., a BCH or SCH transmission subframe, etc.) may always be regarded as not having an SS and a full-duplex backhaul subframe may always be regarded as having an SS.

The above-described relay operation may be applied to a UE operation by replacing a backhaul subframe with a TDD DL subframe and replacing a non-backhaul subframe with a TDD UL subframe.

Embodiment 2: Search Space Stealing

The SS sharing method of Embodiment 1 relates to a method of supporting the same DCI format size with respect to CCs. In contrast, in the present example, a method of supporting different DCI format sizes with respect to CCs will be described. More specifically, in the present example, idle CC SSs are simply merged into one specific CC SS so as to increase the size of the specific CC SS. For convenience, the method of the present example is referred to as CC aggregation.

Figure 29:
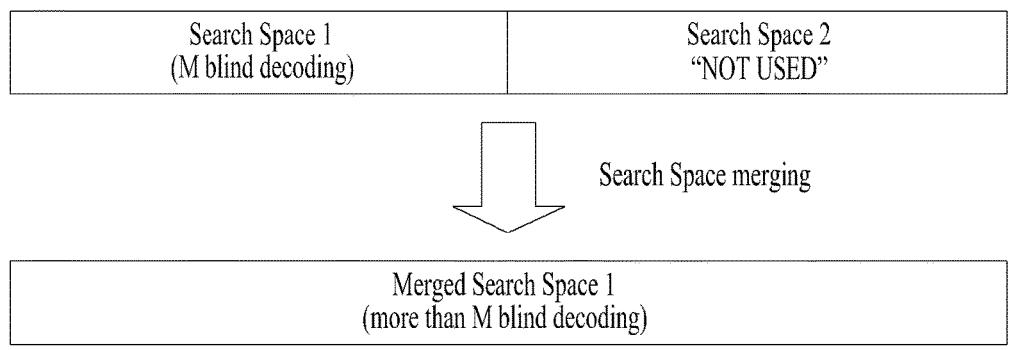
FIGS. 29 to 35 are diagrams showing examples of configuring a search space using a search space merging method.

FIG. 29 shows a CC aggregation method according to an embodiment of the present invention. Although two CC SSs are configured in the present example, the method of the present example may be applied to the case in which three or more CC SSs are configured. In the drawing, it is assumed that SS1 is for CC1 and SS2 is for CC2. A CC SS is referred to as an individual SS to be distinguished from the merged SS.

Referring to FIG. 29, SSs are separately configured per CC, and if an idle CC SS is generated, the idle CC SS is merged into an SS for another CC. FIG. 29 shows an example in which, if SS2 is not used, SS2 is merged into SS1. Therefore, the CC SS size of SS1 is increased. Since the size of the merged SS is greater than that of the individual CC SS, BD complexity may be increased in the merged SS. However, since R-PDCCH placement flexibility is also increased, this method is used for the purpose of increasing R-PDCCH placement flexibility to reduce a collision probability. Preferably, in order to reduce BD complexity in the merged SS, the positions of the R-PDCCH candidates may be restricted in the merged SS. For example, the positions of the R-PDCCH candidates may be non-contiguous within the merged SS. More specifically, P (P being an integer of 2 or more) CCE intervals may be placed between start points of the R-PDCCH candidates in consideration of the number of merged CC SSs.

FIGS. 30 to 35 show configuration examples using SS merging. FIGS. 32 to 35 show an SS merging rule when an idle CC SS is generated.

Figure 30:
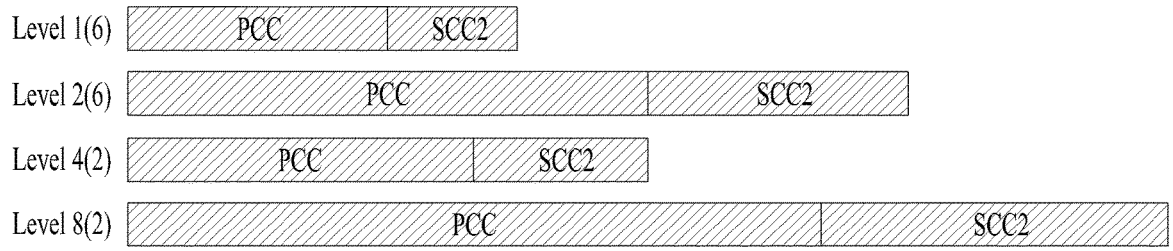
Figure 31:
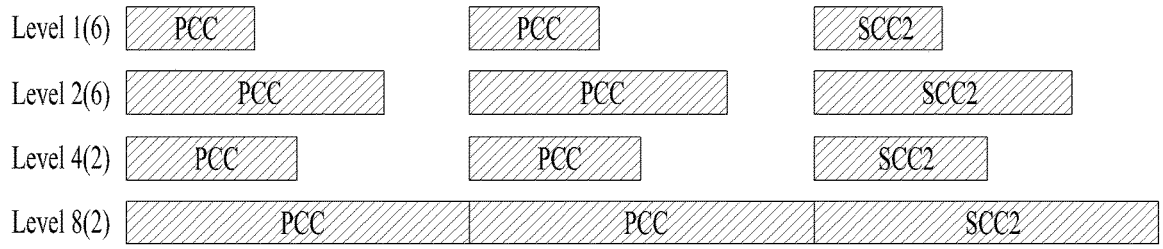

FIGS. 30 and 31 show SS merging examples of the case in which three CCs are configured (or activated) (e.g., PCC, SCC1 and SCC2) and a CC SS for SCC1 is not used in a specific subframe. Referring to FIGS. 30 and 31, the idle CC SS may be preferentially merged into a PCC SS. Accordingly, R-PDCCH candidates for PCC may be transmitted via PCC SS and SCC SS1. In contrast, R-PDCCH candidates for SCC2 may be transmitted only via SCC SS2. In addition, as the size of a PCC SS is increased, a PCC SS and an SS of another relay may be configured to overlap more. In this case, R-PDCCH placement flexibility may be increased due to SS overlap. FIG. 30 shows the case in which CC SSs are contiguously arranged according to CCE aggregation level and FIG. 31 shows the case in which CC SSs are contiguously arranged in units of 16 VRBs (CCEs).

Considering that SS resources are configured by RRC and may not be dynamically changed in subframe units, a rule indicating into which CC an SS is merged is preferably predefined. For example, each or a combination of the following rules are applicable.

All idle SSs may be merged into a PCC SS. For example, if an SCC1 SS or an SCC2 SS become idle SSs, both the SCC1 SS and SCC2 SS may be merged into the PCC SS (see FIGS. 30 and 31).

Figure 32:
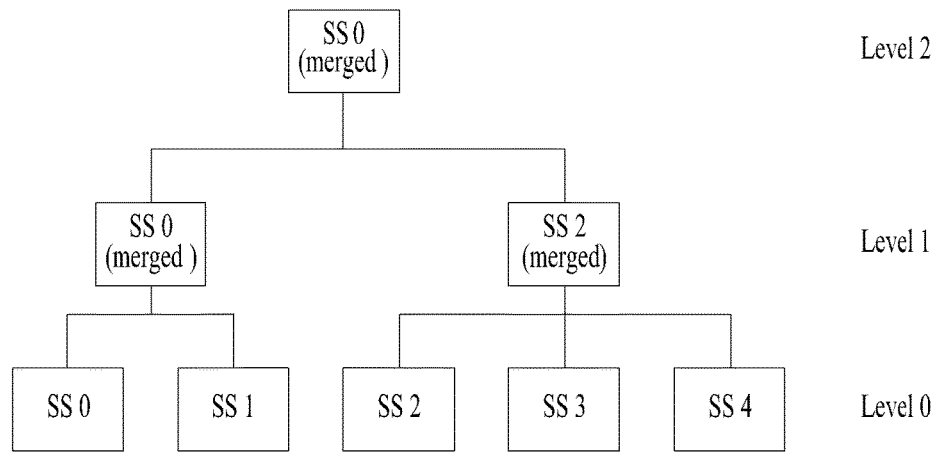
Figure 33:
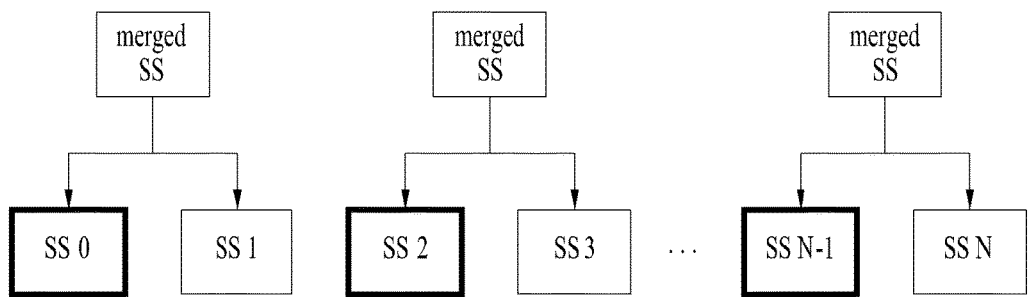

A CC SS may be merged according to a predefined tree structure or a tree structure signaled by a higher layer (see FIG. 32).

N CC SSs having neighboring indexes may be merged. In the case of N=2, CC SSs having neighboring indexes, such as PCC+SCC1, SCC2+SCC3 and SCC4+SCC5, may be merged. That is, the SS2 SS may be merged into the SCC3 SS if the SCC2 SS becomes an idle SS, and the SS3 SS may be merged into the SCC2 SS if the SCC3 SS becomes an idle SS (see FIG. 33). The index includes a CC index or a CIF value. If both the SCC2 SS and the SCC3 SS become idle SSs, the SC0C2 SS and the SCC3 SS may not be merged into another SS or may be merged into N CC SSs having low indexes. For example, SCC3 and SSC3 SS may be merged into the PCC SS and the SCC1 SS, respectively.

The idle SS may be merged into an SS having a smaller index among neighboring CC SSs. Referring to CC configurations of FIGS. 30 and 31, the SCC2 SS may be merged into the SCC1 SS. Similarly, the SCC1 SS may be merged into the PCC SS. The index includes a CC index or a CIF value. The CC index may be, for example, configured in order of PCC, SCC1, SCC2, SCC3 and SCC4. An indexing method may be variously set. For example, an eNB may inform a relay of an indexing method in advance through higher layer signaling (e.g., RRC signaling). In addition, the indexing method may be defined between an eNB and a relay in advance.

Figure 34:
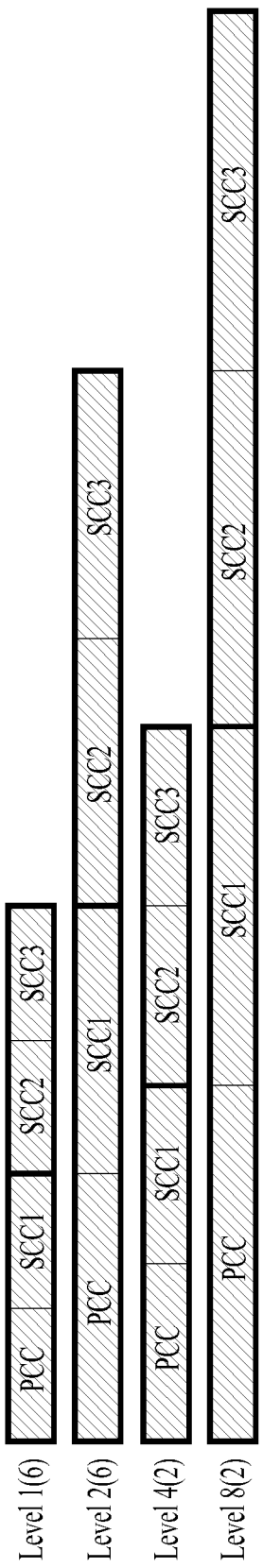
Figure 35:
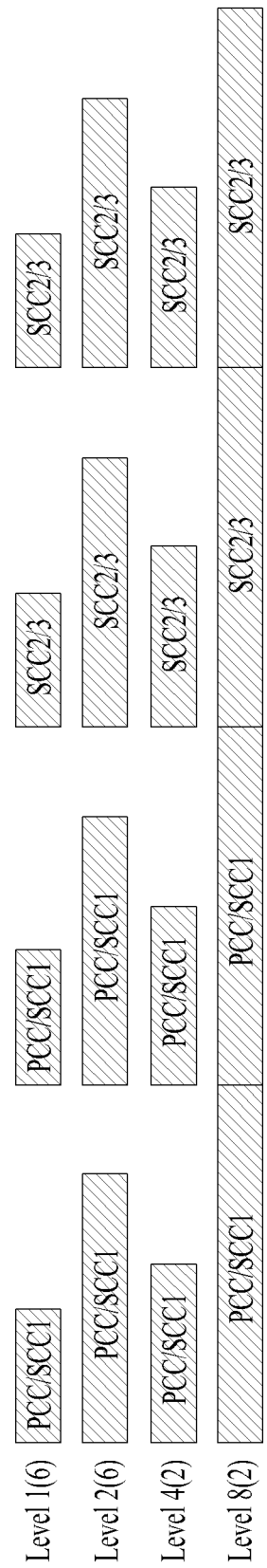

Grouping SSs in specific units and merging CC SSs in a group is possible. In this case, an idle SS in the group is merged into another CC SS in the same group. If a plurality of CC SSs is used in the group, the idle CC SS may be merged into the CC SS having the smallest index or an index which is specified in advance. For example, if SS0, SS1 and SS2 are present in a group and SS1 is not used, SS1 may be merged into a reference SS (e.g., SS0). In this case, SS2 is used alone. If SS2 is also not used, both SS1 and SS2 may be merged into the reference SS (e.g., SS0). The reference SS may be given through higher layer signaling (e.g., RRC signaling) or a predefined method (e.g., an SS having the smallest/largest index among SSs in the group). If the reference SS (e.g., SS0) is not used, the SS having the second smallest/largest index (e.g., SS1)

may become the reference SS. FIGS. 34 and 35 show group-based SS merging and groups [PCC, SCC1] and [SCC2, SCC3].

Embodiment 3: Signaling

As described with reference to FIG. 15, since resources (e.g., VRB sets) for SSs are configured by higher layer signaling (e.g., RRC signaling), the configured resources are mostly likely to be maintained. Meanwhile, a relay may be aware of an SS idle subframe in which an idle CC SS is present in consideration of a subframe configuration of each CC without separate signaling. As described with reference to FIG. 21, if a non-backhaul subframe, a subframe of a deactivated CC and a TDD UL subframe are present, an idle CC SS may be generated. Accordingly, the relay may expect an SS idle subframe using subframe allocation information (e.g., bitmap information of a backhaul pattern) of each CC.

However, preferably, information indicating which DL subframe is a backhaul subframe may be signaled per a cell. That is, in addition to R-PDCCH RA information of FIG. 15, an explicit signal indicating presence/absence of an SS in subframe units may be added. In this case, the relay may acquire VRB set configuration of a frequency domain and time-based subframe configuration information of the VRB set so as to be more clearly aware of a CC SS and an idle CC SS in every subframe. In addition, information about the SS merging rule described with reference to Embodiment 2 may also be signaled. Information about the SS merging rule may include the number of CC SSs to be merged and information indicating a specific SS merging rule if a plurality of SS merging rules is possible.

Embodiment 4: Physical Resource Mapping

In the present example, a method of mapping SSs to physical resources (e.g., PRBs) is proposed. First, for each CC SS, separate VRB sets may be set using separate higher layer signals (e.g., an RRC signaling). According to the present invention, CC SSs are separated in terms of physical resources. Accordingly, in the case of an R-PDCCH using interleaving, R-PDCCHs transmitted via different CC SSs are not mutually interleaved and are transmitted using physically separated frequency resources. According to the present method, if an SS idle subframe is present on a specific CC, a VRB set configured for an idle CC SS may be used for other purposes (e.g., used for PDSCH transmission) in the subframe. For convenience, for the idle CC SS, a reserved VRB set is referred to as an idle SS VRB set. Since a VRB set for an SS is set on a scheduling CC, an idle SS VRB set may be used by a scheduling CC for other purposes. For example, if a subframe k (k being an integer) is an SS idle subframe in a specific CC, it may be assumed that an R-PDCCH is not present in the idle SS VRB set on the scheduling CC in the subframe k. In this case, the idle SS VRB set on the scheduling CC may be used as normal resources.

Figure 36:
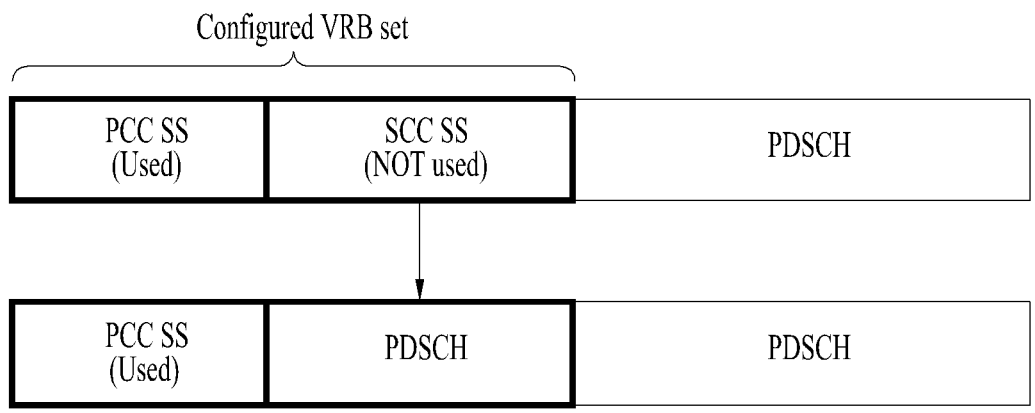
FIG. 36 is a diagram showing signal transmission using an idle search space resource.

FIG. 36 shows signal transmission using an idle SS VRB set according to an embodiment of the present invention. For convenience, a PCC SS is used for R-PDCCH transmission and a SCC SS is not used for R-PDCCH transmission in a specific subframe. A VRB set for the PCC SS and a VRB, set for the SCC S are set on a scheduling CC.

Referring to FIG. 36, if the SCC SS is not used, an eNB may transmit data (e.g., PDSCH) using an idle SS VRB set for SCC. If allocated PDSCH resources overlap with the idle SS VRB set, a relay may perform a PDSCH decoding including information of overlapped part in the idle SS VRB set. That is, if allocated PDSCH resources overlap with the idle SS VRB set, the relay assumes that PDSCH transmission is present in a part in which the PDSCH resources overlap with the idle SS VRB set. Unlike, an SS VRB set may be used for R-PDCCH transmission (that is, non-idle SS VRB set) and, if allocated PDSCH resources overlap with the non-idle SS VRB set, the relay assumes that a PDSCH is not present in a part in which the PDSCH resources overlap with the non-idle SS VRB set when the PDSCH is decoded. That is, the relay punctures the part corresponding to the non-idle SS VRB set from the allocated PDSCH resources when the PDSCH is decoded. By pre-defining an operation according to presence/absence of the idle SS VRB set, it is possible to reduce PDSCH decoding error due to R-PDCCH misdetection.

Alternatively, only a VRB set for an entire SS may be set through a higher layer signal (e.g., RRC signal). The entire SS means an integrated one of all CC SSs. According to the present method, since CC SSs share one physical resource, it is possible to reduce an R-PDCCH blocking probability. However if R-PDCCHs are transmitted using the same VRB set in all subframes, resources may be inefficiently managed. For example, even if an SS idle subframe (e.g., a non-backhaul subframe, a TDD UL subframe, etc.) is generated in a specific CC and thus the amount of resources necessary for the R-PDCCH is decreased, an appropriate countermeasure may not be prepared. In particular, such a problem may be increased in an interleaving mode in which a plurality of R-PDCCHs is interleaved together to occupy a wide frequency band. Since the R-PDCCHs are interleaved in units (e.g., REGs) smaller than an RB, the plurality of R-PDCCHs may be transmitted in one or more RBs (or RB pair) by being interleaved. At this time, an R-PDCCH may be present only in a part of one RB (or RB pair), but the RB (or RB pair) may not be used for other purposes even when the R-PDCCH is present only in part of the RB (or RB pair).

As a method of solving the above-described problem, a VRB set configured for R-PDCCH transmission is controlled according to subframe. In the present method, in the case of interleaving R-PDCCH, interleaving depth is adjusted according to subframe. Here, the interleaving depth means a resource range (e.g., the number of VRBs) in which interleaving is performed.

Figure 37:
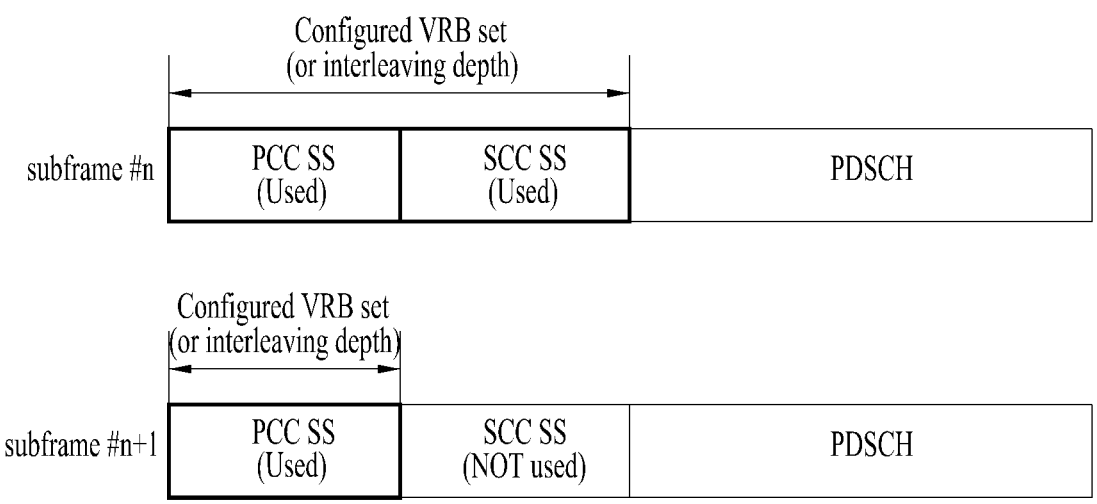
FIG. 37 is a diagram showing a method of controlling the amount of search space resources.

FIG. 37 shows a method of adjusting interleaving depth according to an embodiment of the present invention. For convenience, it is assumed that a PCC SS is always used for R-PDCCH transmission, and an SCC SS is used or not for R-PDCCH transmission according to circumstance. A VRB set for the PCC SS and a VRB set for the SCC SS are set on a scheduling CC. Referring to FIG. 37, if the SCC SS is used for R-PDCCH transmission, R-PDCCH interleaving is performed with respect to the PCC SS VRB set+the SCC SS VRB set. That is, the interleaving depth corresponds to the PCC SS VRB set+the SCC SS VRB set. Meanwhile, if the SCC SS is not used for R-PDCCH transmission, the SCC SS is excluded from R-PDCCH interleaving. That is, R-PDCCH interleaving is performed only with respect to the PCC SS VRB set and the interleaving depth corresponds to the PCC SS VRB set.

Through the above-described adjustment, it is possible to use an appropriate VRB set for R-PDCCH transmission in every subframe. The above-described operation for adjusting the VRB set in a subframe unit is not applied only to a relay having a plurality of CCs. For example, even when a single CC is configured, the present method may be used for appropriate resource adaptation if the amount of physical resources necessary for R-PDCCH transmission is changed in each DL subframe for some reason.

Figure 38:
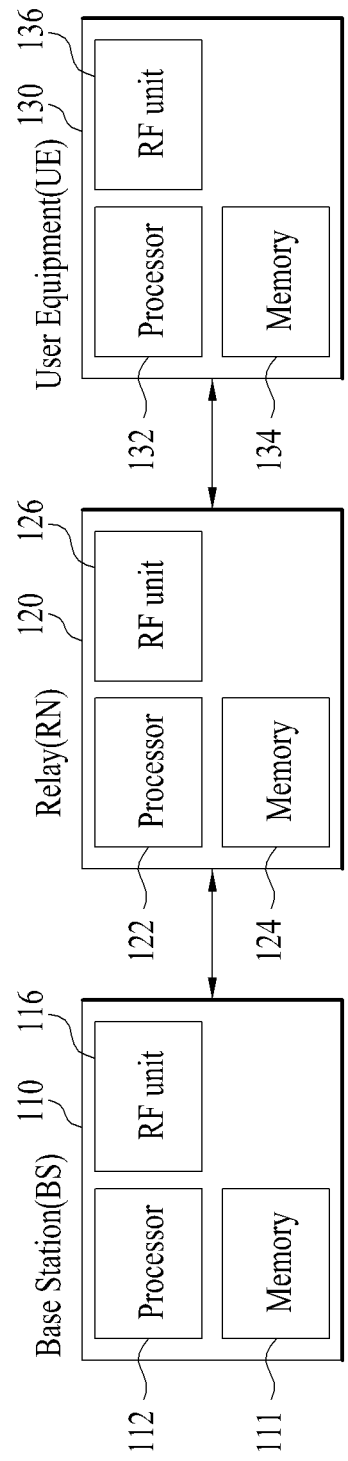
FIG. 38 is a diagram showing a base station (BS), a relay node (RN) and a UE to which the present invention is applicable.

FIG. 38 is a diagram showing a BS, a relay and a UE to which the present invention is applicable.

Referring to FIG. 38, a wireless communication system includes a base station (BS) 110, a relay node (RN) 120 and a UE 130. Although a UE connected to an RN is shown for convenience, the UE may be connected to the BS.

The BS 110 includes a processor 112, a memory 114 and a radio frequency (RF) unit 116. The processor 112 may be configured to implement the procedures and/or methods proposed by the present invention. The memory 114 is connected to the processor 112 so as to store a variety of information associated with operation of the processor 112. The RF unit 116 is connected to the processor 112 so as to transmit and/or receive an RF signal. The RN 120 includes a processor 122, a memory 124 and an RF unit 126. The processor 122 may be configured to implement the procedures and/or methods proposed by the present invention. The memory 124 is connected to the processor 122 so as to store a variety of information associated with the operation of the processor 122. The RF unit 126 is connected to the processor 122 so as to transmit and/or receive a RF signal. The UE 130 includes a processor 132, a memory 134 and an RF unit 136. The processor 132 may be configured to implement the procedures and/or methods proposed by the present invention. The memory 134 is connected to the processor 132 so as to store a variety of information associated with the operation of the processor 132. The RF unit 136 is connected to the processor 132 so as to transmit and/or receive a RF signal. The BS 110, the RN 120 and/or the UE 130 may have a single antenna or multiple antennas.

The above-described embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a relay node and a base station. The data communication relationship is equally/similarly applied to signal transmission/reception between a UE and a base station or a UE and a relay node. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "terminal" may also be replaced with the term user equipment (UE), mobile station (MS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. Software code may be stored in a memory unit so as to be executed by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

The present invention may be used in a terminal, a base station or other equipment in a wireless communication system. More specifically, the present invention is applicable to a method and apparatus for transmitting uplink control information.

The invention claimed is:

1. A method of receiving downlink information at a user equipment (UE) configured with a plurality of cells in a wireless communication system, the method comprising:
   receiving, by the UE, a Radio Resource Control (RRC) signaling indicating specific subframes in which the UE monitors UE specific search spaces,
   wherein each of the UE specific search spaces is associated with a respective carrier indicator field (CIF) value; and
   monitoring, by the UE, at least one first physical downlink control channel (PDCCH) candidate, in the specific subframes indicated by the RRC signaling, for a first cell among the plurality of cells,
   wherein the monitoring, by the UE, of the at least one first PDCCH candidate is for the first cell in two or more UE specific search spaces for PDCCH candidates having different CIF values and
   the same downlink control information (DCI) format size,
   wherein the at least one first PDCCH candidate is monitored, by the UE, on a first region other than a control region on which a second PDCCH different from a first PDCCH is monitored, by the UE, in the specific subframes, and
   wherein the UE only monitors the at least one second PDCCH candidate for the first cell without monitoring the at least one first PDCCH candidate for the first cell in subframes other than the specific subframes indicated by the RRC signaling.

2. The method according to claim 1,
wherein the specific subframes include a plurality of orthogonal frequency division multiple access (OFDMA) symbols and the search spaces are set within OFDMA symbols other than first M OFDMA symbols in the subframe, and M is a positive integer.

3. A user equipment (UE) for receiving downlink information with a plurality of cells in a wireless communication system, the UE comprising:
   a radio frequency (RF) module; and
   a processor configured to control the RF module,
   wherein the processor is configured to:
   receive a Radio Resource Control (RRC) signaling indicating plurality of specific subframes in which the UE monitors UE specific search spaces,
   wherein each of the UE specific search spaces is associated with a respective carrier indicator field (CIF) value, and monitor at least one first physical downlink control channel (PDCCH) candidate, in the specific subframes indicated by the RRC signaling, for a first cell among the plurality of cells
   wherein the monitoring, by the UE, of the at least one first PDCCH candidate is for the first cell in two or more UE specific search spaces for PDCCH candidates having different CIF values and the same downlink control information (DCI) format size,
   wherein the at least one first PDCCH candidate is monitored, by the UE, on a first region other than a control region on which a second PDCCH different from a first PDCCH is monitored by the UE in the specific subframes, and
   wherein the processor is further configured to only monitor the at least one second PDCCH candidate for the first cell without monitoring the at least one first PDCCH candidate for the first cell in subframes other than the specific subframes indicated by the RRC signaling.

4. The UE according to claim 3,
wherein the specific subframes include a plurality of orthogonal frequency division multiple access (OFDMA) symbols and the search spaces are set within OFDMA symbols other than first M OFDMA symbols in the subframe, and M is a positive integer.

* * * * *